(12) United States Patent
Hwang et al.

(10) Patent No.: US 11,689,404 B2
(45) Date of Patent: *Jun. 27, 2023

(54) METHOD AND APPARATUS FOR TRANSMITTING SIDELINK REFERENCE SIGNAL IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 2 days.

This patent is subject to a terminal disclaimer.

(21) Appl. No.: 17/549,435

(22) Filed: Dec. 13, 2021

(65) Prior Publication Data
US 2022/0103412 A1 Mar. 31, 2022

Related U.S. Application Data

(63) Continuation of application No. 16/931,186, filed on Jul. 16, 2020, now Pat. No. 11,201,772, which is a
(Continued)

(30) Foreign Application Priority Data

Oct. 2, 2019 (KR) .......... 10-2019-0122629
Oct. 29, 2019 (KR) .......... 10-2019-0135607

(51) Int. Cl.
*H04L 27/26* (2006.01)
*H04L 5/10* (2006.01)
(Continued)

(52) U.S. Cl.
CPC .......... *H04L 27/261* (2013.01); *H04L 1/0061* (2013.01); *H04L 5/0048* (2013.01);
(Continued)

(58) Field of Classification Search
CPC ..... H04W 72/20; H04W 72/21; H04W 72/23; H04W 72/04; H04W 72/044;
(Continued)

(56) References Cited

U.S. PATENT DOCUMENTS

2019/0229964 A1  7/2019  Ouchi et al.
2019/0313394 A1  10/2019  Kubota et al.
(Continued)

FOREIGN PATENT DOCUMENTS

KR  20210134058  11/2021
WO  WO2018027222  2/2018
(Continued)

OTHER PUBLICATIONS

LG Electronics, "Discussion on essential corrections in physical layer structure," R1-2007772, Presented at 3GPP TSG RAN WG1 Meeting #103-e, e-Meeting, Oct. 26-Nov. 13, 2020, 23 pages.
(Continued)

*Primary Examiner* — Peter Chen
(74) *Attorney, Agent, or Firm* — Fish & Richardson P.C.

(57) ABSTRACT

Provided herein is a method for performing, by a first apparatus, wireless communication and an apparatus for supporting the same. The method may include the steps of generating a Phase Tracking—Reference Signal (PT-RS), transmitting a Physical Sidelink Control Channel (PSCCH) to a second apparatus, mapping, based on a Cyclic Redundancy Check (CRC) on the PSCCH, the PT-RS to a subcarrier on a Physical Sidelink Shared Channel (PSSCH) resource related to the PSCCH, and transmitting the PT-RS to the second apparatus.

20 Claims, 33 Drawing Sheets

Related U.S. Application Data continuation of application No. PCT/KR2020/005827, filed on May 4, 2020.

(60) Provisional application No. 62/928,353, filed on Oct. 30, 2019, provisional application No. 62/843,315, filed on May 3, 2019.

(51) Int. Cl.
  *H04L 1/00* (2006.01)
  *H04L 5/00* (2006.01)
  *H04W 92/18* (2009.01)
  *H04W 72/0453* (2023.01)

(52) U.S. Cl.
  CPC .......... *H04L 5/10* (2013.01); *H04L 27/26025* (2021.01); *H04W 72/0453* (2013.01); *H04L 5/0044* (2013.01); *H04L 5/0051* (2013.01); *H04W 92/18* (2013.01)

(58) Field of Classification Search
  CPC ......... H04W 72/0446; H04W 72/0453; H04W 4/40; H04W 4/44; H04W 4/46; H04W 92/16; H04W 92/18; H04L 5/0048; H04L 5/0044; H04L 5/0051; H04L 5/06; H04L 5/10; H04L 27/261; H04L 27/26025
  See application file for complete search history.

(56) References Cited

U.S. PATENT DOCUMENTS

| | | |
|---|---|---|
| 2019/0356463 A1 | 11/2019 | Zhang et al. |
| 2020/0029318 A1 | 1/2020 | Guo |
| 2020/0280412 A1 | 9/2020 | Qi et al. |
| 2021/0321403 A1 | 10/2021 | Ye et al. |
| 2022/0015083 A1 | 1/2022 | Yeo et al. |
| 2022/0132496 A1 | 4/2022 | Li et al. |

FOREIGN PATENT DOCUMENTS

| | | |
|---|---|---|
| WO | WO 2019051085 | 3/2019 |
| WO | WO2020031392 | 2/2020 |

OTHER PUBLICATIONS

LG Electronics, "Discussion on physical layer structure for NR sidelink," R1-1911346, Presented at 3GPP TSG RAN WG1 #98bis, Chongqing, China, Oct. 14-20, 2019, 41 pages.

Notice of Allowance in Japanese Appln. No. 2021-565038, dated Aug. 23, 2022, 6 pages (with English translation).

Samsung, "Feature lead summary#! for agenda item 7.2.4.1 Physical layer structure for sidelink," R1-1912457, Presented at 3GPP TSG RAN WG1 #99 Meeting, Reno, USA, Nov. 18-22, 2019, 32 pages.

ZTE & Sanechips, "NR sidelink physical layer structure," R1-1912514, Presented at 3GPP TSG RAN WG1 #99, Reno, USA, Nov. 18-22, 2019, 12 pages.

Huawei, HiSilicon, "Sidelink reference signal design for NR V2X," R1-1903945, 3GPP TSG RAN WG1 Meeting #96bis, Xi'an, China, Apr. 8-12, 2019, 12 pages.

LG Electronics, "Discussion on physical layer structure for NR sidelink," R1-1905437, 3GPP TSG RAN WG1 #96bis, Xi'an, China, Apr. 8-12, 2019, 18 pages.

Mitsubishi Electric, "Views on physical layer design for NR V2X sidelink," R1-1905123, 3GPP TSG RAN WG1 #96b, Xi'an, China, Apr. 8-12, 2019, 17 pages.

PCT International Search Report in International Appln. No. PCT/KR2020/005827, dated Aug. 12, 2020, 7 pages (with English translation).

Spreadtrum Communications, "Discussion on physical layer structure for sidelink," R1-1906361, 3GPP TSG RAN WG1 #97, Reno, USA, May 13-17, 2019, 15 pages.

Extended European Search Report in European Application No. 20802577.5, dated Apr. 28, 2022, 10 pages.

METHOD AND APPARATUS FOR TRANSMITTING SIDELINK REFERENCE SIGNAL IN NR V2X

CROSS-REFERENCE TO RELATED APPLICATIONS

This application is a continuation of U.S. application Ser. No. 16/931,186, filed on Jul. 16, 2020, which is a continuation pursuant to 35 U.S.C. § 119(e) of International Application PCT/KR2020/005827, with an international filing date of May 4, 2020, which claims the benefit of U.S. Provisional Patent Applications No. 62/843,315, filed on May 3, 2019, No. 62/928,353, filed on Oct. 30, 2019, Korean Patent Applications No. 10-2019-0122629, filed on Oct. 2, 2019, and No. 10-2019-0135607, filed on Oct. 29, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in case of a situation where a user equipment performs communication and/or a situation where a user equipment travels (or moves) at a high speed, while the user equipment transmits/receives a PSCCH and/or PSSCH, the phase of a signal may change abruptly in symbol units. Therefore, in the aforementioned situation(s), a Phase Tracking Reference Signal (PT-RS) for phase compensation may be needed. Therefore, a method for transmitting a PT-RS, by a user equipment, and an apparatus supporting the same.

Technical Solutions

According to an embodiment of the present disclosure, provided herein is a method for performing, by a first apparatus, wireless communication. The method may include the steps of generating a Phase Tracking—Reference Signal (PT-RS), transmitting a Physical Sidelink Control Channel (PSCCH) to a second apparatus, mapping, based on a Cyclic Redundancy Check (CRC) on the PSCCH, the PT-RS to a subcarrier on a Physical Sidelink Shared Channel (PSSCH) resource related to the PSCCH, and transmitting the PT-RS to the second apparatus.

According to an embodiment of the present disclosure, provided herein is a first apparatus for performing wireless communication. For example, the first apparatus may include one or more memories storing instructions, one or more transceivers, and one or more processors connected to the one or more memories and the one or more transceivers. The one or more processors may execute the instructions to generate a Phase Tracking—Reference Signal (PT-RS), to transmit a Physical Sidelink Control Channel (PSCCH) to a second apparatus, to map, based on a Cyclic Redundancy Check (CRC) on the PSCCH, the PT-RS to a subcarrier on a Physical Sidelink Shared Channel (PSSCH) resource related to the PSCCH, and to transmit the PT-RS to the second apparatus.

Effects of the Disclosure

A user equipment (UE) may efficiently perform SL communication.

DESCRIPTION OF EXEMPLARY EMBODIMENTS

Figure 1:
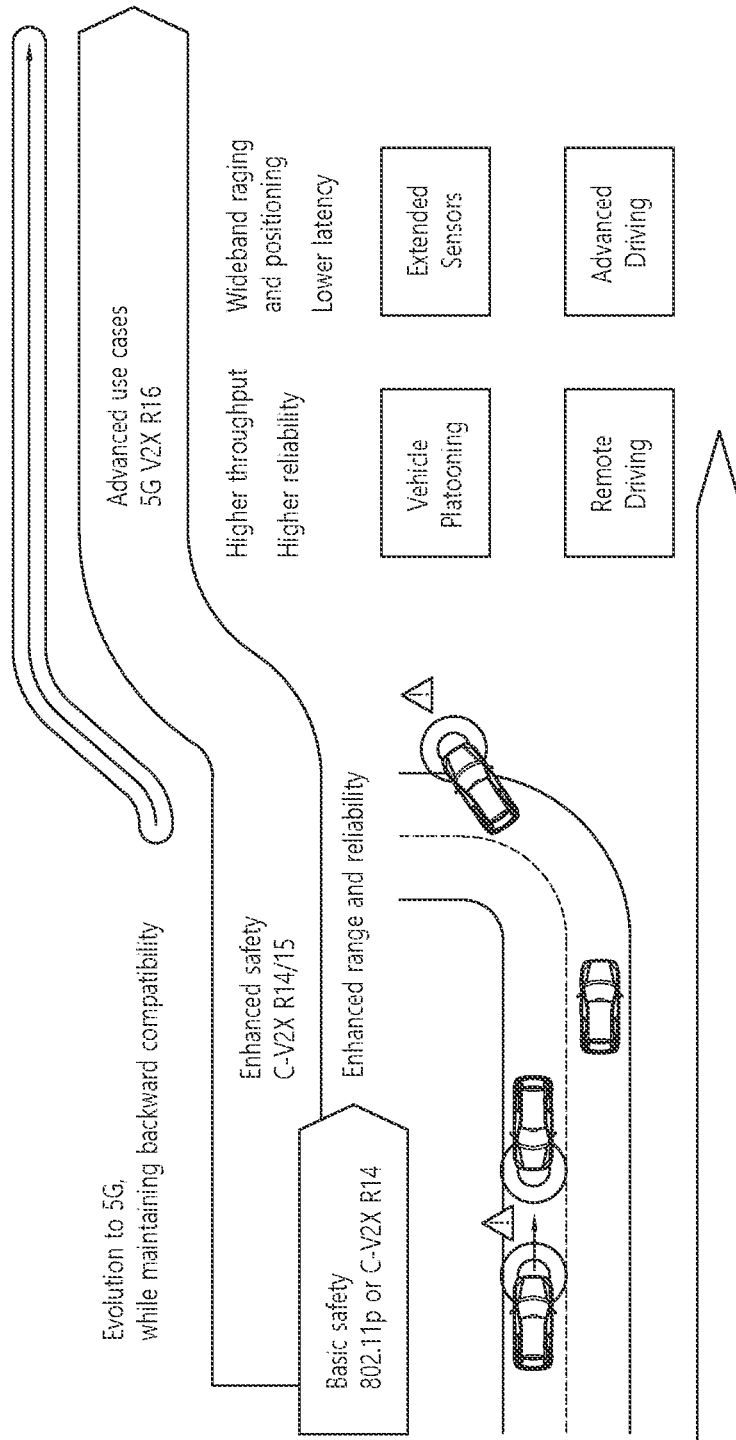
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B".

For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
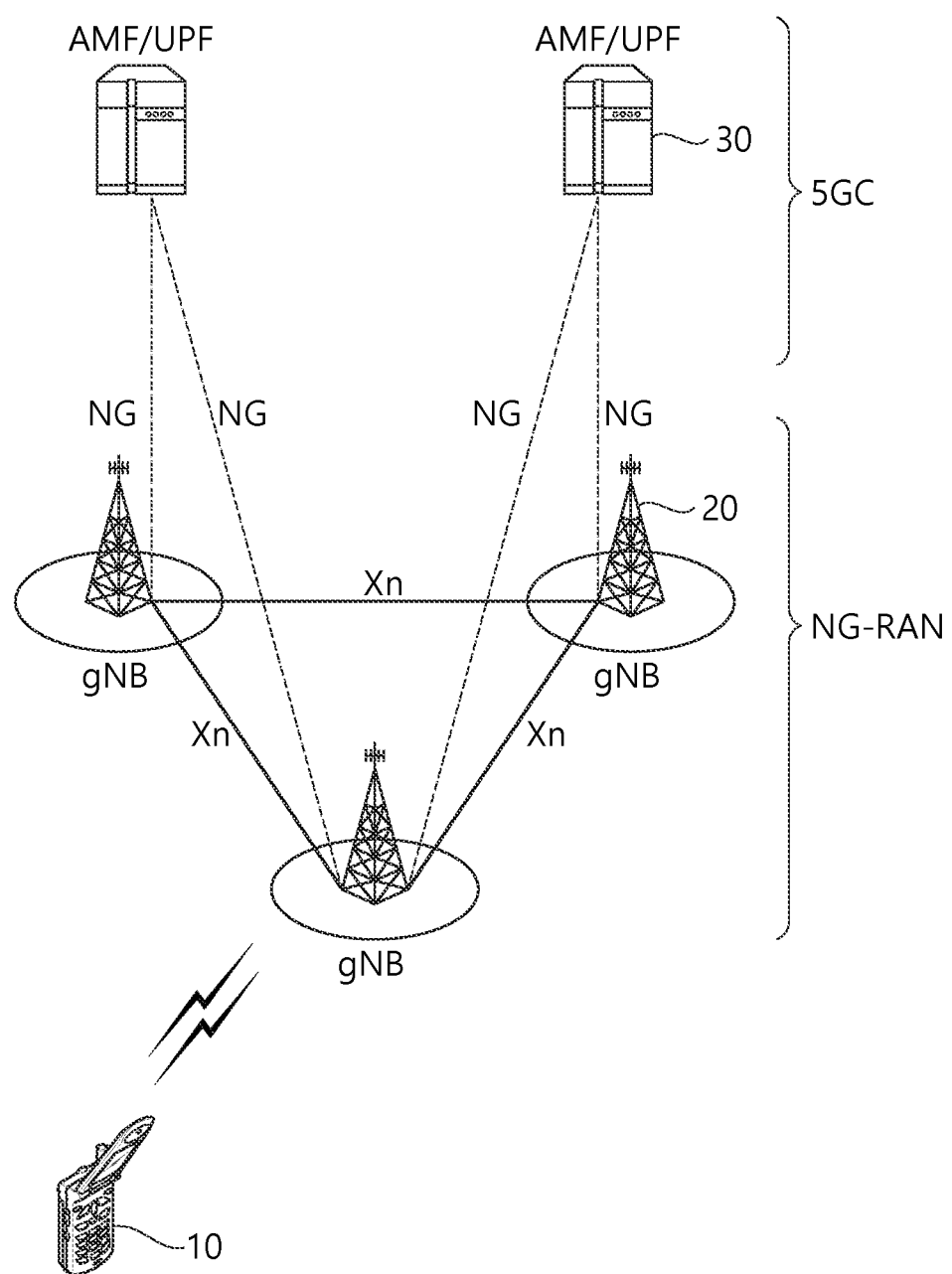
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation—radio access network (NG-RAN) may include a BS (20) providing a UE (10) with a user plane and control plane protocol termination. For example, the BS (20) may include a next generation-Node B (gNB) and/or an evolved-NodeB (eNB). For example, the UE (10) may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE (10) and may be referred to as other terms, such as a base transceiver system (BTS), an access point (AP), and so on.

The embodiment of FIG. 2 exemplifies a case where only the gNB is included. The BSs (20) may be connected to one another via Xn interface. The BS (20) may be connected to one another via 5th generation (5G) core network (5GC) and NG interface. More specifically, the BSs (20) may be connected to an access and mobility management function (AMF) (30) via NG-C interface, and may be connected to a user plane function (UPF) (30) via NG-U interface.

Figure 3:
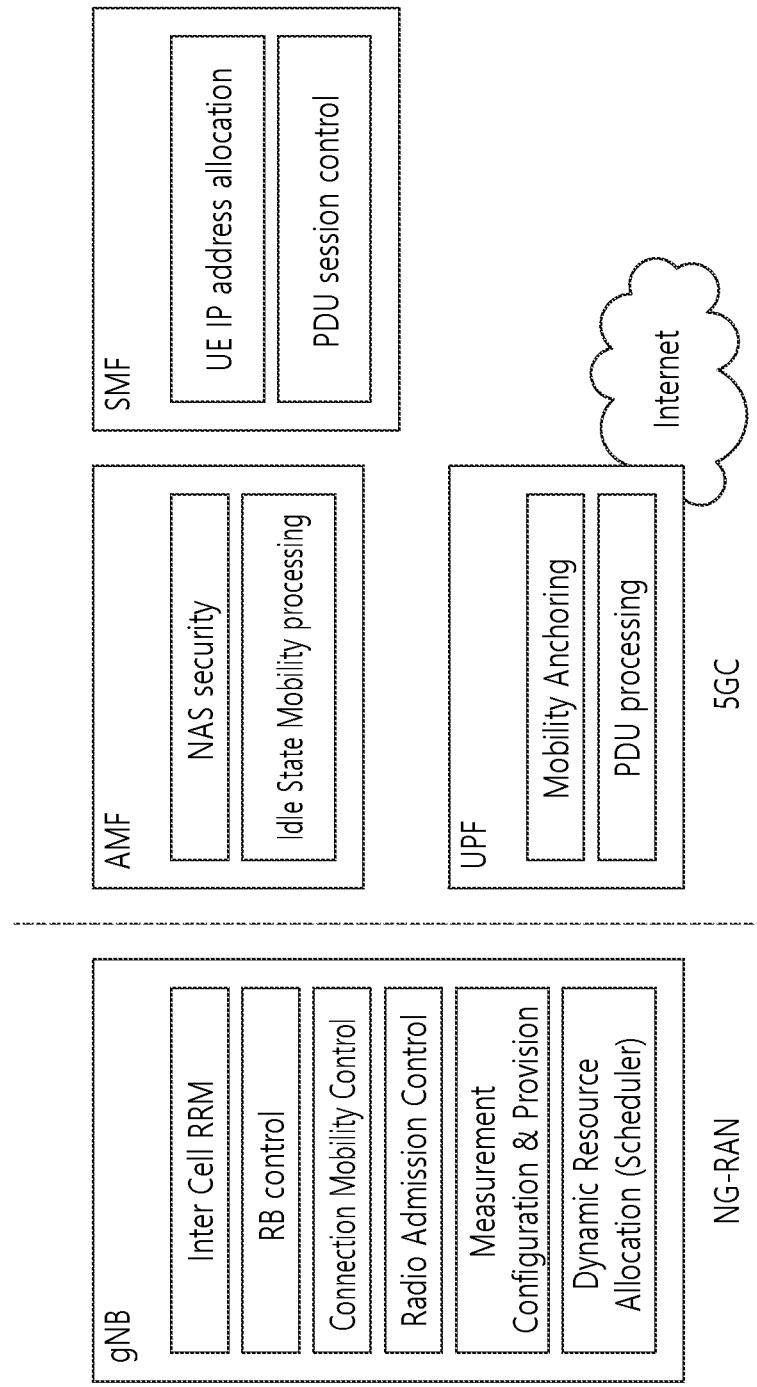
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
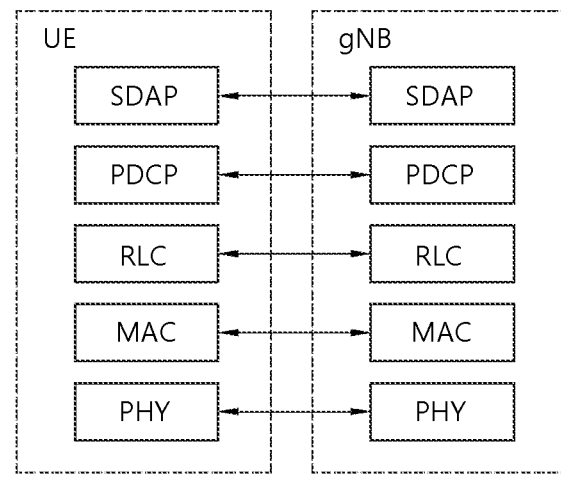
FIGS. 4A and 4B show a radio protocol architecture, in accordance with an embodiment of the present disclosure.
Figure 4B:
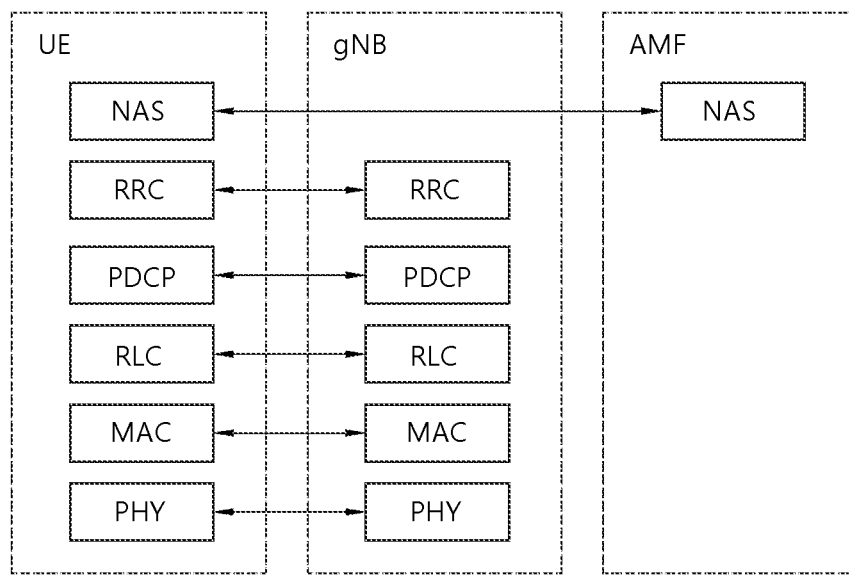

FIGS. 4A and 4B show a radio protocol architecture, in accordance with an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane is a protocol stack for user data transmission, and the control plane is a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
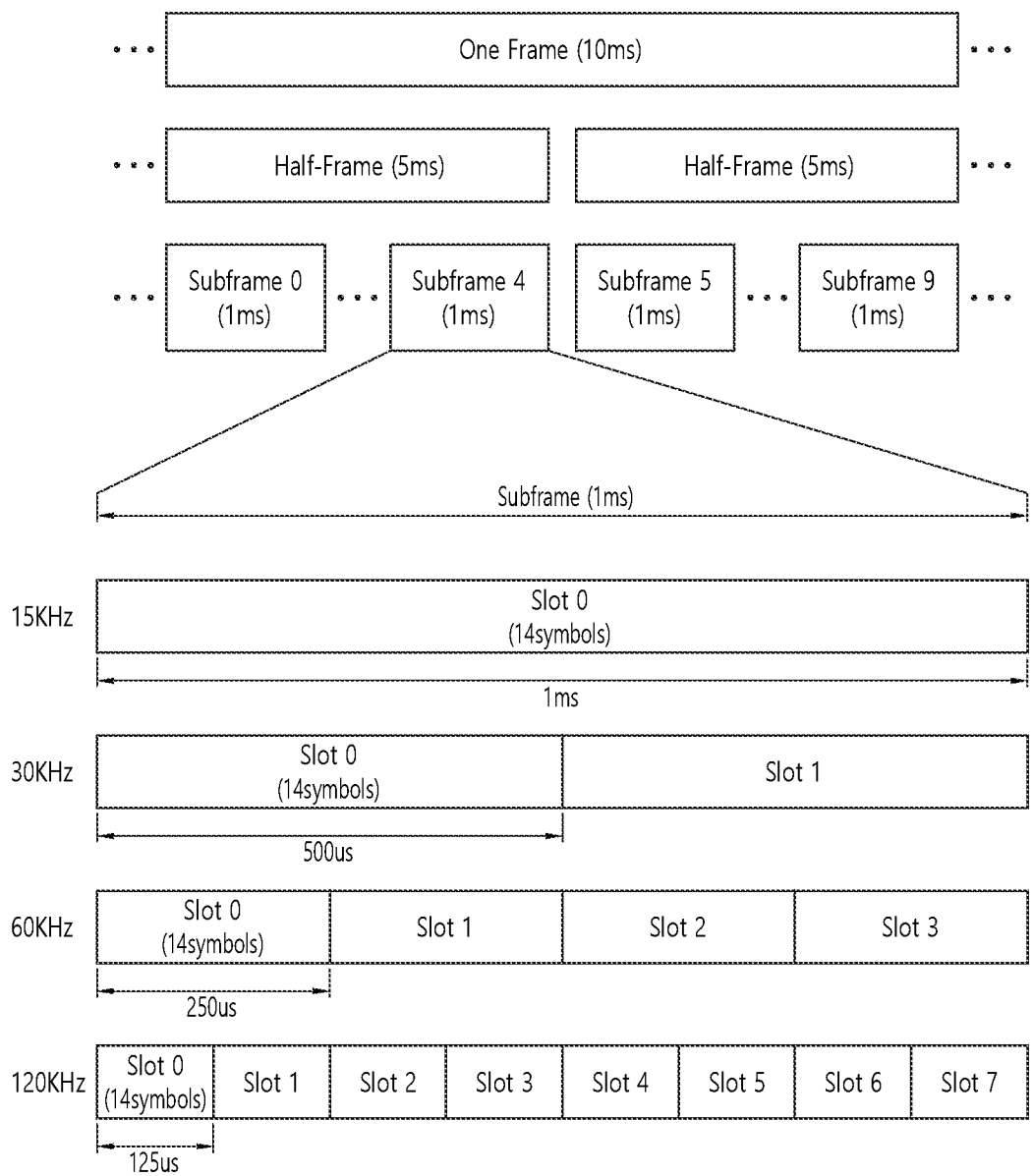
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15*$2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
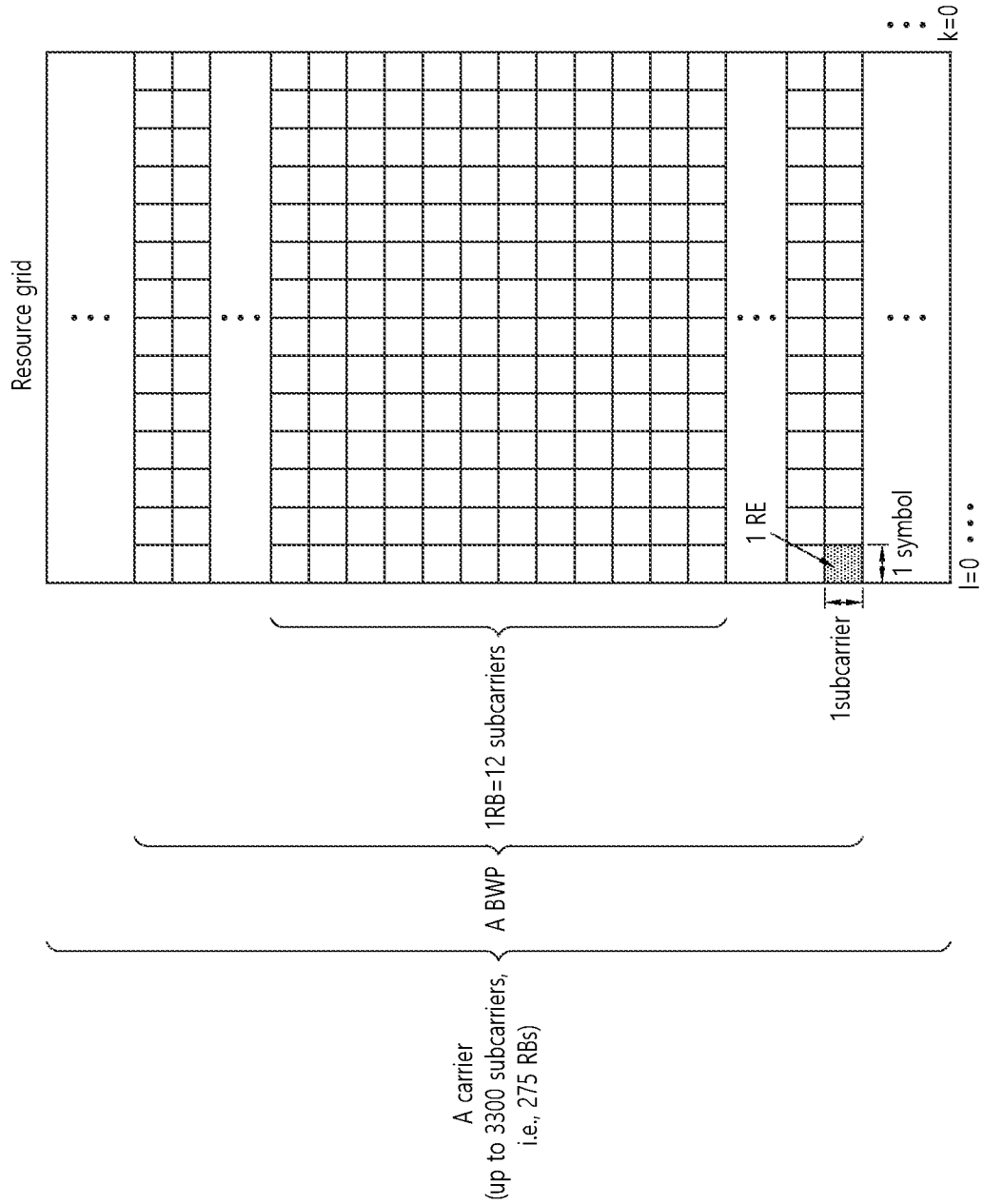
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
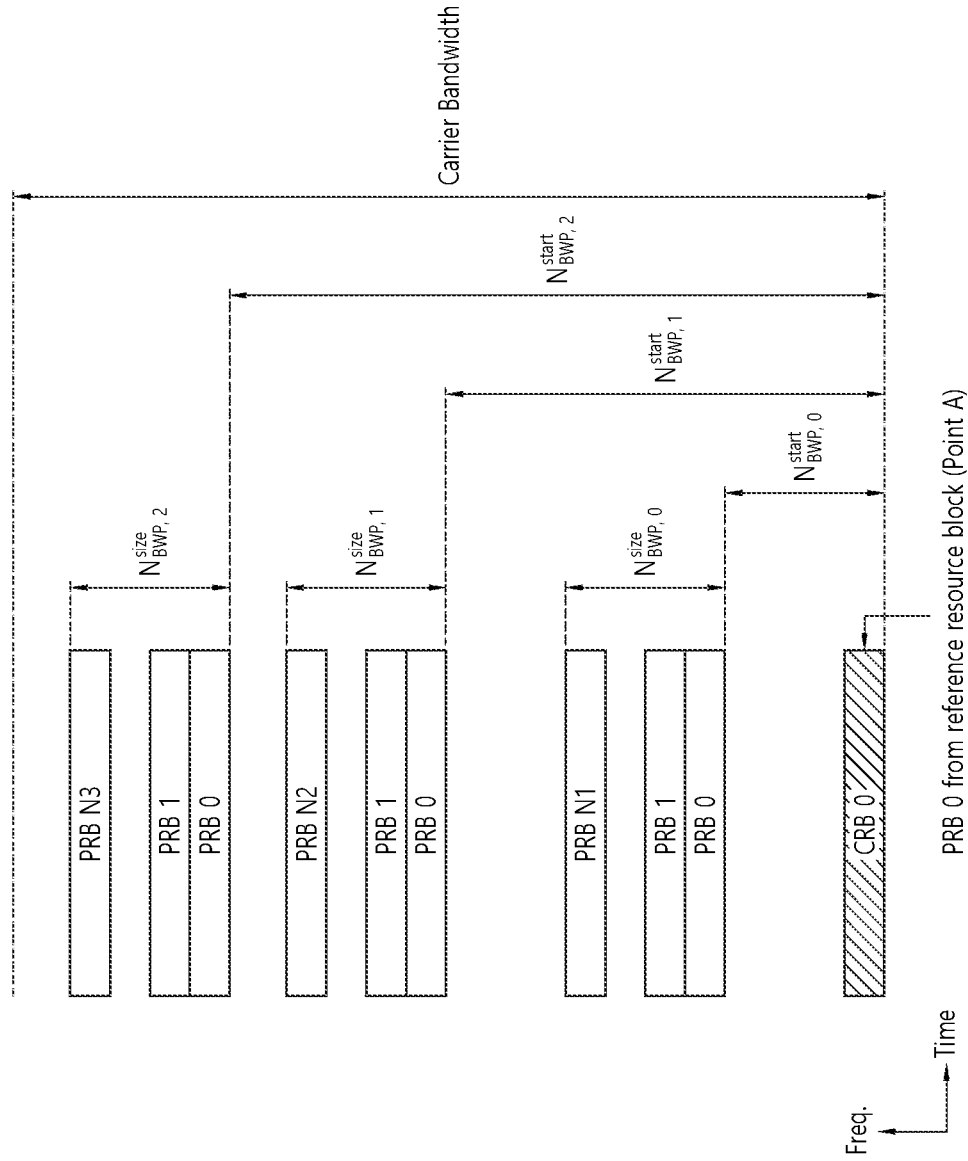
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. Point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
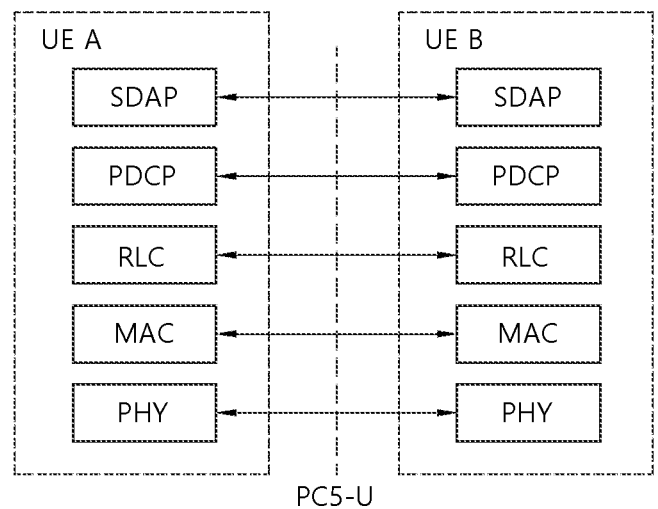
FIGS. 8A and 8B show a radio protocol architecture for a SL communication, in accordance with an embodiment of the present disclosure.
Figure 8B:
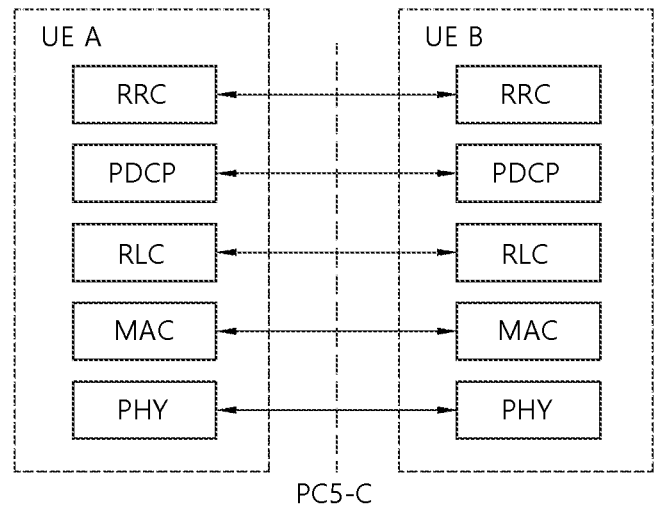

FIGS. 8A and 8B show a radio protocol architecture for a SL communication, in accordance with an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
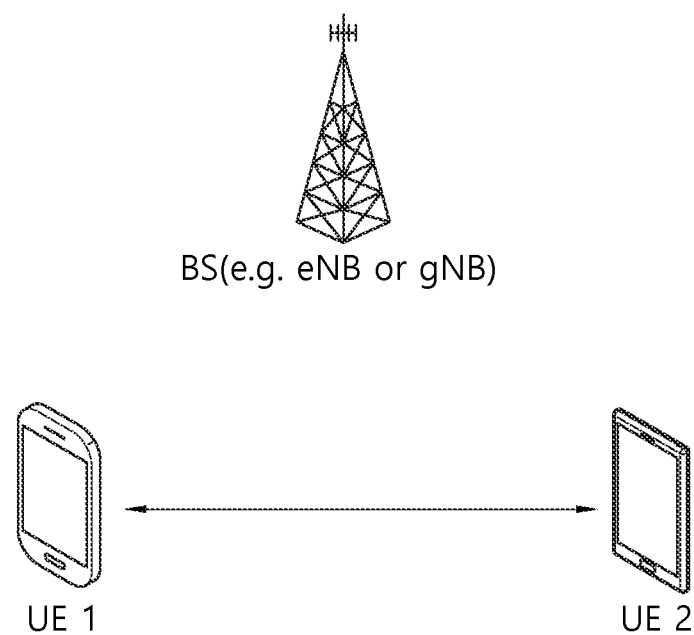
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus (100), and a UE 2 may be a second apparatus (200).

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10B:
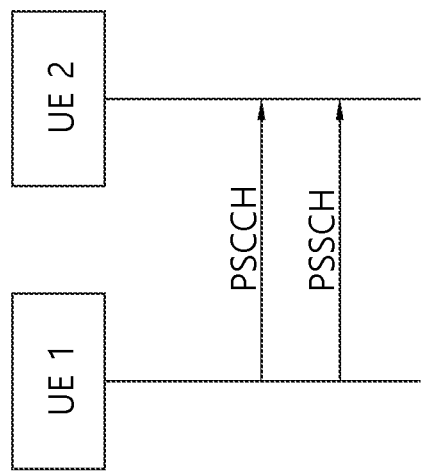
FIGS. 10A and 10B show a procedure of performing V2X or SL communication by a UE based on a transmission mode, in accordance with an embodiment of the present disclosure.
Figure 10A:
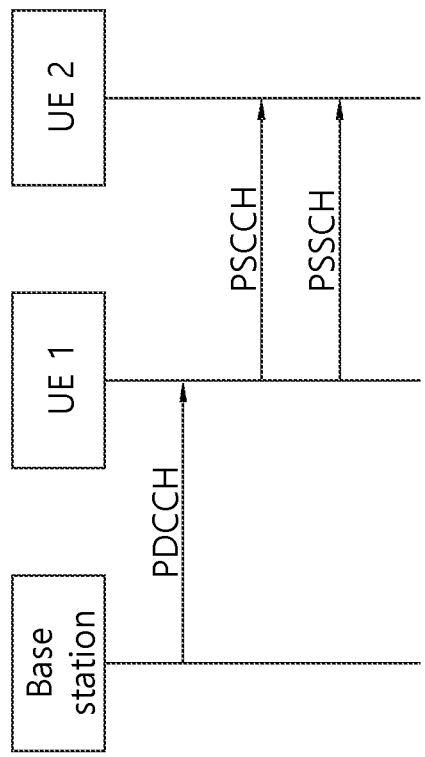

FIGS. 10A and 10B show a procedure of performing V2X or SL communication by a UE based on a transmission mode, in accordance with an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11C:
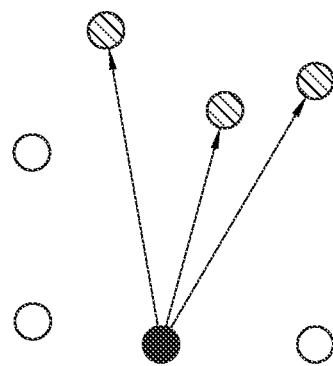
FIGS. 11A to 11C show three cast types, in accordance with an embodiment of the present disclosure.
Figure 11B:
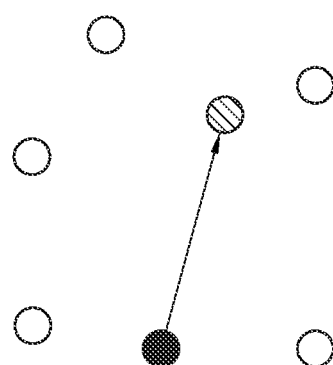
Figure 11A:
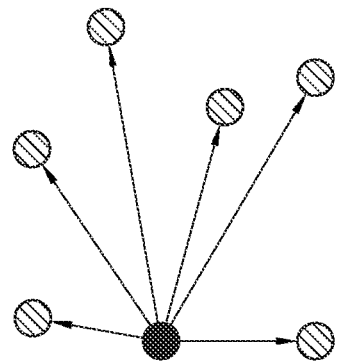

FIGS. 11A to 11C show three cast types, in accordance with an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, power control will be described.

A method in which a UE controls uplink transmit power thereof may include open loop power control (OLPC) and closed loop power control (CLPC). Based on the OLPC, the UE may estimate a downlink pathloss from a BS of a cell to which the UE belongs, and the UE may perform power control in such a manner that the pathloss is compensated for. For example, based on the OLPC, if a distance between the UE and the BS further increases and thus a downlink pathloss increases, the UE may control uplink power in such a manner that uplink transmit power is further increased. Based on the CLPC, the UE may receive information (e.g., a control signal) required to adjust uplink transmit power from the BS, and the UE may control uplink power based on the information received from the BS. That is, based on the CLPC, the UE may control the uplink power based on a direct power control command received from the BS.

The OLPC may be supported in SL. Specifically, when the transmitting UE is inside the coverage of the BS, the BS may enable OPLC for unicast, groupcast, and broadcast transmission based on the pathloss between the transmitting UE and a serving BS of the transmitting UE. If the transmitting UE receives information/configuration for enabling the OLPC from the BS, the transmitting UE may enable OLPC for unicast, groupcast, or broadcast transmission. This may be to mitigate interference for uplink reception of the BS.

Additionally, at least in case of unicast, a configuration may be enabled to use the pathloss between the transmitting UE and the receiving UE. For example, the configuration may be pre-configured for the UE. The receiving UE may report an SL channel measurement result (e.g., SL RSRP) to the transmitting UE, and the transmitting UE may derive pathloss estimation from the SL channel measurement result reported by the receiving UE. For example, in SL, if the transmitting UE transmits a reference signal to the receiving UE, the receiving UE may estimate a channel between the transmitting UE and the receiving UE based on the reference signal transmitted by the transmitting UE. In addition, the receiving UE may transmit the SL channel measurement result to the transmitting UE. In addition, the transmitting UE may estimate the SL pathloss from the receiving UE based on the SL channel measurement result. In addition, the transmitting UE may perform SL power control by compensating for the estimated pathloss, and may perform SL transmission for the receiving UE. Based on the OLPC in SL, for example, if a distance between the transmitting UE and the receiving UE further increases and thus the SL pathloss increases, the transmitting UE may control SL transmit power in such a manner that the SL transmit power is further increased. The power control may be applied in SL physical channel (e.g., PSCCH, PSSCH, physical sidelink feedback channel (PSFCH)) and/or SL signal transmission.

In order to support the OLPC, at least in case of unicast, long-term measurement (e.g., L3 filtering) may be supported on SL.

For example, total SL transmit power may be identical in symbols used for PSCCH and/or PSSCH transmission in a slot. For example, maximum SL transmit power may be configured for the transmitting UE or may be pre-configured.

For example, in case of the SL OLPC, the transmitting UE may be configured to use only a downlink pathloss (e.g., a pathloss between the transmitting UE and the BS). For example, in case of the SL OLPC, the transmitting UE may be configured to use only an SL pathloss (e.g., a pathloss between the transmitting UE and the receiving UE). For example, in case of the SL OLPC, the transmitting UE may be configured to use a downlink pathloss and the SL pathloss.

For example, if the SL OLPC is configured to use both the downlink pathloss and the SL pathloss, the transmitting UE may determine a minimum value as transmit power among power obtained based on the downlink pathloss and power obtained based on the SL pathloss. For example, PO and an alpha value may be configured separately for the downlink pathloss and the SL pathloss or may be pre-configured. For example, PO may be a user-specific parameter related to SINR received on average. For example, the alpha value may be a weight value for the pathloss.

Hereinafter, sidelink (SL) congestion control will be described.

If a UE autonomously determines an SL transmission resource, the UE also autonomously determines a size and frequency of use for a resource used by the UE. Evidently, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources is consumed, it is preferable that the UE autonomously decreases the use of resources. In the present specification, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present specification, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
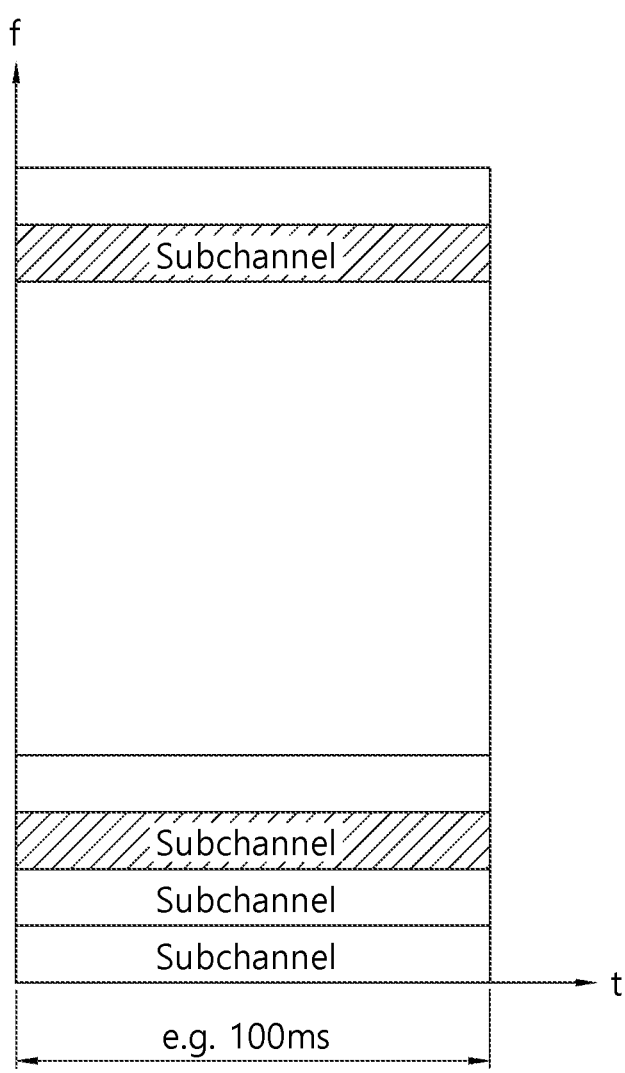
FIG. 12 shows a resource unit for CBR measurement, in accordance with an embodiment of the present disclosure.

FIG. 12 shows a resource unit for CBR measurement, in accordance with an embodiment of the present disclosure. The embodiment of FIG. 12 may be combined with various embodiments of the present disclosure.

Referring to FIG. 12, CBR may denote the number of subchannels in which a measurement result value of a received signal strength indicator (RSSI) has a value greater than or equal to a pre-configured threshold as a result of measuring the RSSI by a UE on a subchannel basis for a specific period (e.g., 100 ms). Alternatively, the CBR may denote a ratio of subchannels having a value greater than or equal to a pre-configured threshold among subchannels for a specific duration. For example, in the embodiment of FIG. 12, if it is assumed that a hatched subchannel is a subchannel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a Pt SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or Modulation Coding Scheme (MCS) information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports Location information of a transmitting UE or location (or distance region) information of a target receiving UE (for which SL HARQ feedback is requested), and/or Reference signal (e.g., Demodulation Reference Signal (DMRS), and so on) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

Meanwhile, in case of a situation where a user equipment performs communication and/or a situation where a user equipment travels (or moves) at a high speed, on a high carrier frequency, such as FR2, while the user equipment transmits/receives a PSCCH and/or PSSCH, the phase of a signal may change abruptly in symbol units. Therefore, in the aforementioned situation(s), a Phase Tracking Reference Signal (PT-RS) for phase compensation may be needed. In this specification, a PT-RS may be a reference signal for phase noise. And, in order to compensate for phase noise, the PT-RS may be almost evenly mapped to a time axis on a time-frequency resource and then transmitted.

Meanwhile, in order to increase usage efficiency of resources for data, a form having resources for PSSCH surround resources for PSCCH may be supported in a next generation communication system.

Figure 13:
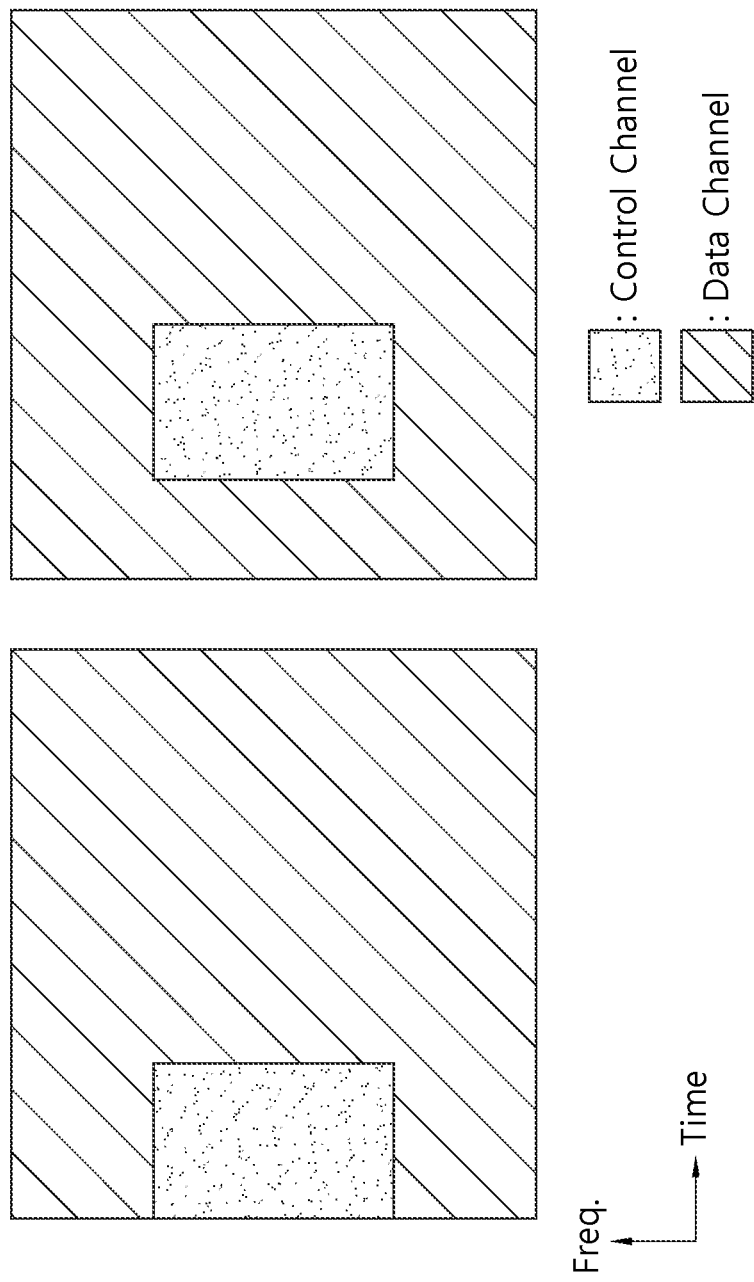
FIG. 13 shows an example of resource allocation for a data channel or a control channel, in accordance with an embodiment of the present disclosure.

FIG. 13 shows an example of resource allocation for a data channel or a control channel, in accordance with an embodiment of the present disclosure. The embodiment of FIG. 13 may be combined with other various embodiments of the present disclosure.

Referring to FIG. 13, resources for a control channel (e.g., PSCCH) may be allocated in a form of being surrounded by resources for a data channel (e.g., PSSCH). More specifically, a PSCCH and a PSSCH may be processed with Frequency Division Multiplexing (FDM) for a specific symbol group or one or more (adjacent) symbols, and, for another symbol group or symbols other than one or more (adjacent) symbols, only a PSSCH may be transmitted.

Hereinafter, according to various embodiments of the present disclosure, a method for transmitting a reference signal and an apparatus supporting the same will be described in detail.

Figure 14:
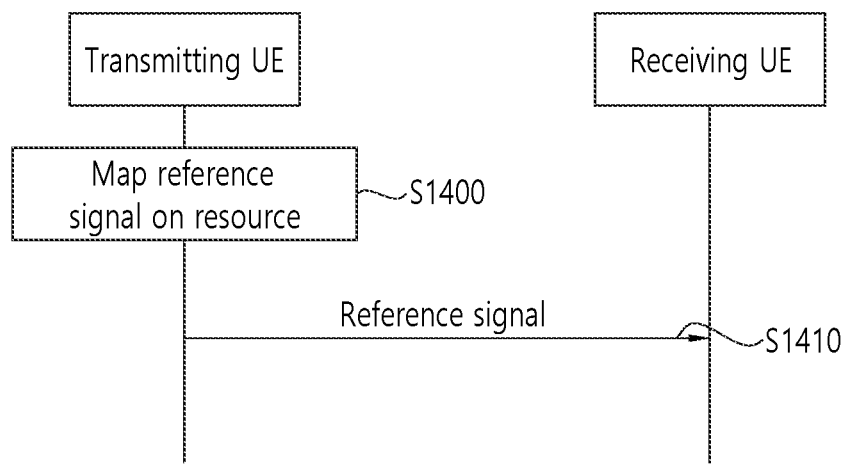
FIG. 14 shows a method for transmitting a reference signal, by a transmitting UE, in accordance with an embodiment of the present disclosure.

FIG. 14 shows a method for transmitting a reference signal, by a transmitting UE, in accordance with an embodiment of the present disclosure. The embodiment of FIG. 14 may be combined with other various embodiments of the present disclosure.

Referring to FIG. 14, in step S1400, a transmitting UE may generate a sequence of reference signals. And, the transmitting UE may map a reference signal on a (time and/or frequency) resource. For example, the reference signal may include at least one of a DMRS for demodulating a PSCCH or a PT-RS for performing phase compensation on a PSSCH. In this specification, a DMRS for demodulating a PSCCH may be referred to as a DMRS for a PSCCH, a DMRS related to a PSCCH, or a PSCCH DMRS. In this specification, a PT-RS for performing phase compensation on a PSSCH may be referred to as a PT-RS for PSSCH. For example, the resource may include at least one of a resource for transmitting a PSCCH or a resource for transmitting a PSSCH. For example, the transmitting UE may differently generate a sequence of a PT-RS in accordance with whether or not transform precoding is enabled.

According to an embodiment of the present disclosure, in a time resource region, a time density of transmission of DMRS for PSCCH may be different in FR1 and FR2. Alternatively, a DMRS density for PSCCH may be different depending upon a carrier frequency. More specifically, in case of FR1, since requirements for phase compensation are low, the transmitting UE may map the DMRS for PSCCH at a low density. For example, among the symbols through which the PSCCH is transmitted, the transmitting UE may map a DMRS for PSCCH to only part of the symbols. Conversely, in case of FR2, since requirements for phase compensation are high, the transmitting UE may map the DMRS for PSCCH at a high density. For example, the transmitting UE may map a DMRS for PSCCH to all symbols of the PSCCH.

Figure 15:
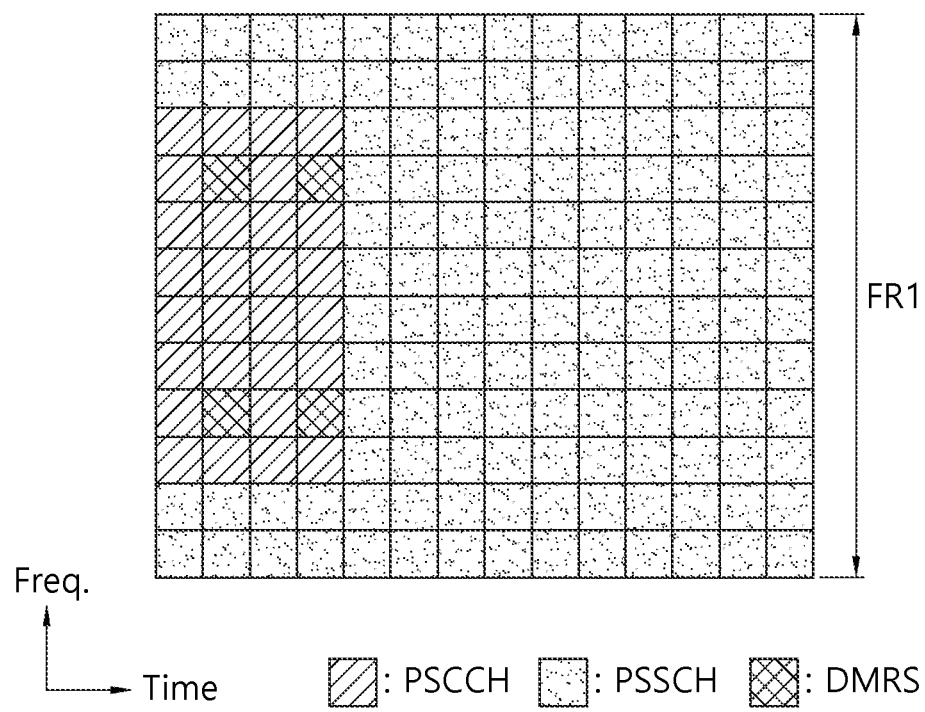
FIG. 15 shows an example of mapping a DMRS for a PSCCH, by a transmitting UE operating on FR1, in accordance with an embodiment of the present disclosure.

FIG. 15 shows an example of mapping a DMRS for a PSCCH, by a transmitting UE operating on FR1, in accordance with an embodiment of the present disclosure. The embodiment of FIG. 15 may be combined with other various embodiments of the present disclosure.

Referring to FIG. 15, in case of FR1, the transmitting UE may map a DMRS for PSCCH at a low density.

Figure 16:
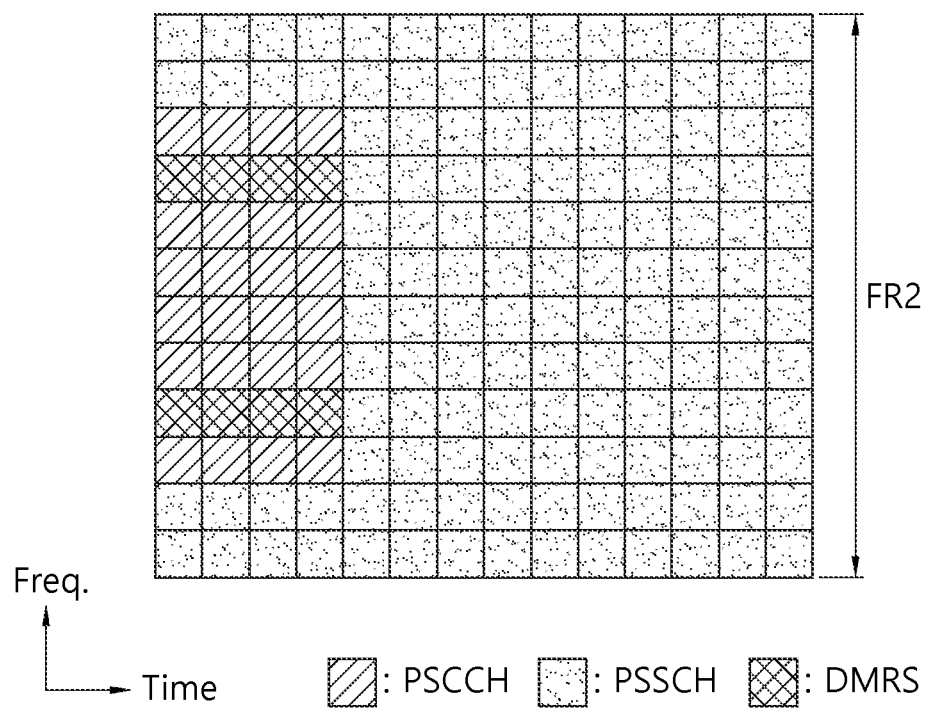
FIG. 16 shows an example of mapping a DMRS for a PSCCH, by a transmitting UE operating on FR2, in accordance with an embodiment of the present disclosure.

FIG. 16 shows an example of mapping a DMRS for a PSCCH, by a transmitting UE operating on FR2, in accordance with an embodiment of the present disclosure. The embodiment of FIG. 16 may be combined with other various embodiments of the present disclosure.

Referring to FIG. 16, in case of FR2, the transmitting UE may map a DMRS for PSCCH at a high density. For example, the transmitting UE may map a DMRS for PSCCH to all symbols along a time axis, while maintaining frequency axis density of the DMRS for PSCCH.

Figure 17:
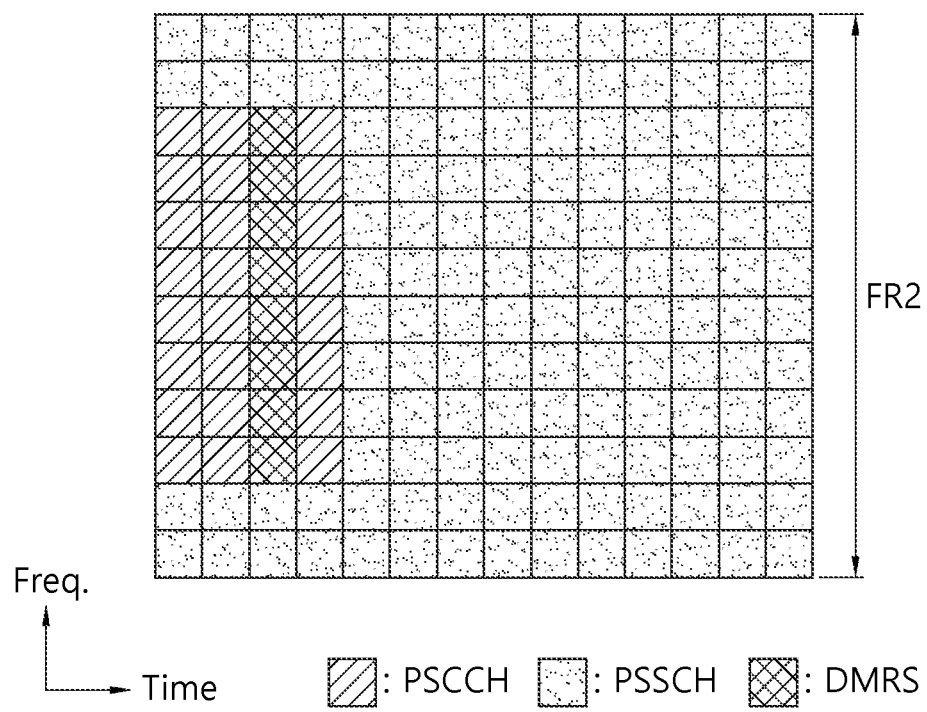
FIG. 17 shows an example of mapping a DMRS for a PSCCH, by a transmitting UE operating on FR2, in accordance with an embodiment of the present disclosure.

FIG. 17 shows an example of mapping a DMRS for a PSCCH, by a transmitting UE operating on FR2, in accordance with an embodiment of the present disclosure. The embodiment of FIG. 17 may be combined with other various embodiments of the present disclosure.

Referring to FIG. 17, in case of FR2, the transmitting UE may map a DMRS for PSCCH at a high density. For example, the transmitting UE may map a DMRS for PSCCH to all symbols on a specific time axis.

According to an embodiment of the present disclosure, a mapping pattern to a time-frequency resource of a DMRS for PSCCH may be (pre-)configured for a UE. For example, a mapping pattern to a time-frequency resource of a DMRS for PSCCH may be (pre-)configured for a UE per subcarrier spacing, numerology, and/or frequency range.

According to an embodiment of the present disclosure, when a transmitting UE maps a PT-RS on a resource being allocated for PSSCH transmission, the transmitting UE may map a PT-RS, at a higher priority, for a PSSCH resource (e.g., Resource Element (RE), subcarrier, or Resource Block (RB)) of a frequency domain that is different from a frequency domain having PSCCH mapped thereto. For example, when a transmitting UE maps a PT-RS on a resource being allocated for PSSCH transmission, the transmitting UE may map a PT-RS, at a higher priority, for a PSSCH resource (e.g., Resource Element (RE), subcarrier, or Resource Block (RB)) of a frequency domain having PSCCH mapped thereto.

Figure 18:
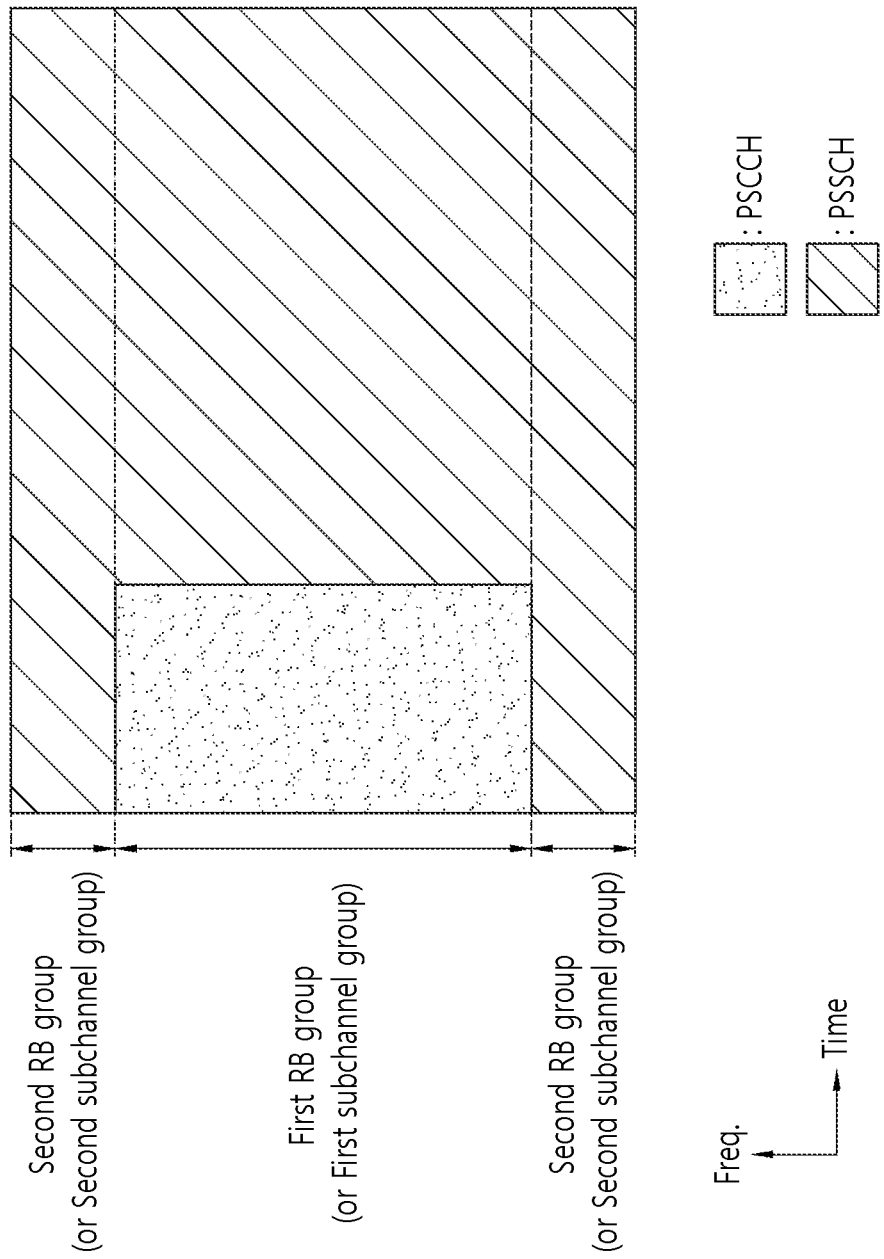
FIG. 18 shows a method for mapping a PT-RS on a resource being allocated, by a transmitting UE, for a PSSCH transmission, in accordance with an embodiment of the present disclosure.

FIG. 18 shows a method for mapping a PT-RS on a resource being allocated, by a transmitting UE, for a PSCCH transmission, in accordance with an embodiment of the present disclosure. The embodiment of FIG. 18 may be combined with other various embodiments of the present disclosure.

Referring to FIG. 18, a plurality of RBs may be divided into a first RB group (or a first plurality of RBs or a first RB set) and a second RB group (or a second plurality of RBs or a second RB set). Alternatively, a plurality of subchannels may be divided into a first RB group (or a first plurality of subchannels or a first subchannel set) and a second RB group (or a second plurality of subchannels or a second subchannel set). An RB group may include one or more RBs. A subchannel group may include one or more subchannels.

For example, a first RB group may include RBs of a domain (or region) where resources having PSSCH mapped thereto and resources having PSCCH mapped thereto overlap on a frequency axis. More specifically, the first RB group may include RBs of a frequency domain having PSCCH and PSSCH mapped thereto. For example, a second RB group may include RBs of a domain (or region) where resources having PSSCH mapped thereto and resources having PSCCH mapped thereto do not overlap on a frequency axis. More specifically, the second RB group may include RBs of a frequency domain not having PSCCH mapped thereto and only having PSSCH mapped thereto.

For example, a first subchannel group may include subchannels of a domain (or region) where resources having PSSCH mapped thereto and resources having PSCCH mapped thereto overlap on a frequency axis. More specifically, the first subchannel group may include subchannels of a frequency domain having PSCCH and PSSCH mapped thereto. For example, a second subchannel group may include subchannels of a domain (or region) where resources having PSSCH mapped thereto and resources having PSCCH mapped thereto do not overlap on a frequency axis. More specifically, the second subchannel group may include subchannels of a frequency domain not having PSCCH mapped thereto and only having PSSCH mapped thereto.

As in the above-described case, the transmitting UE may perform PT-RS mapping for a first RB group or first subchannel group. If a size of the first RB group or first subchannel group is smaller than or equal to a predetermined level (e.g., a specific threshold value), after performing PT-RS mapping at a higher priority, by the transmitting UE, for a first RB group or first subchannel group, the transmitting UE may perform PT-RS mapping for a second RB group or second subchannel group. For example, the specific threshold value may be pre-defined in the system. Alternatively, for example, the specific threshold value may be (pre-)configured for the UE. If a first RB group or first subchannel group does not exist, the transmitting UE may perform PT-RS mapping for a second RB group or second subchannel group. According to an embodiment of the present disclosure, the transmitting UE may differently perform PT-RS mapping in accordance with a number of RBs or subchannels being allocated or scheduled for PSSCH transmission, a bandwidth and/or Modulation Coding Scheme (MCS) being allocated or scheduled PSCCH transmission, and so on. For example, the transmitting UE may determine density on a time axis of the PT-RS based on a scheduled MCS and a threshold value, and the transmitting UE may then map the PT-RS on the resource in accordance with the determined density of the time axis. For example, a time axis distance/density between PT-RSs of a case where the MCS value is less than or equal to a specific threshold value may be different from a time axis distance/density between PT-RSs of a case where the MCS value is equal to or greater than a specific threshold value. However, this is merely an exemplary embodiment, and, therefore, the PT-RS mapping method (time axis distance/density, and so on) may vary depending upon multiple MCS durations. For example, the transmitting UE may determine a density on a frequency axis of a PT-RS based on a bandwidth being allocated and/or scheduled for PSSCH and/or PSCCH transmission, and the transmitting UE may then map the PT-RS on a resource in accordance with the determined density on the frequency axis.

For example, the transmitting UE may perform PT-RS mapping for a second RB group or second subchannel group at a higher priority than a first RB group or first subchannel group. That is, the transmitting UE may ensure PT-RS mapping to a resource of a frequency domain to which PSSCH is not mapped. If a size of the second RB group or second subchannel group is smaller than or equal to a predetermined level (e.g., a specific threshold value), after performing PT-RS mapping at a higher priority, by the transmitting UE, for the second RB group or second subchannel group, the transmitting UE may subsequently perform PT-RS mapping for the first RB group or first subchannel group. At this point, for example, the specific threshold value may be pre-defined in the system. Alternatively, for example, the specific threshold value may be (pre-)configured for the UE. If a second RB group or second subchannel group does not exist, the transmitting UE may perform PT-RS mapping for a first RB group or first subchannel group.

According to an embodiment of the present disclosure, based on information related to a frequency resource having PSCCH mapped thereto (or information related to a frequency resource being allocated for PSCCH transmission) and/or information related to a frequency resource having PSSCH mapped thereto (or information related to a frequency resource being allocated for PSSCH transmission), the transmitting UE may determine/calculate/obtain an RB offset for PT-RS, a subcarrier offset, and/or a frequency axis gap (or distance) between PT-RSs. For example, the PSCCH frequency information may include a lowest RB, a lowest subcarrier, a highest RB, a highest subcarrier, an RB length, and/or a subchannel size for a PSCCH. For example, the PSSCH frequency information may include a lowest RB, a lowest subcarrier, a highest RB, a highest subcarrier, an RB length, and/or a subchannel size for a PSSCH.

For example, the RB offset and/or subcarrier offset for a PT-RS may be configured starting from a highest RS index and/or highest subcarrier index for PSCCH to after a specific offset. For example, if it is assumed that a highest subcarrier index for PSCCH is K, and if it is assumed that a specific offset is Koffset, the transmitting UE may perform mapping/transmission of a PT-RS from a subcarrier corresponding to a K+Koffset index. For example, the specific offset may be pre-defined in the system. Alternatively, for example, the specific offset may be (pre-)configured for the UE.

For example, the RB offset and/or subcarrier offset for a PT-RS may be configured starting from a lowest RS index and/or lowest subcarrier index for PSCCH to after a specific offset. For example, if it is assumed that a lowest subcarrier index for PSCCH is assumed to be L, and if it is assumed that a specific offset is assumed to be Loffset, the transmitting UE may perform mapping/transmission of a PT-RS from a subcarrier corresponding to an L-Loffset index. In this case, a frequency axis gap (or distance) between PT-RS resources or a minimum value of a frequency axis gap may be configured in a form of having an additional offset being added to or multiplied by an RB length of subchannel size for PSCCH. More specifically, an offset for the starting and/or an offset for the gap (or distance) may be different depending upon a number of RBs, a number of subchannels, and/or MCS for PSSCH. For example, a frequency axis distance/density between PT-RSs of a case where the MCS value is less than or equal to a specific threshold value may be different from a frequency axis distance/density between PT-RSs of a case where the MCS value is equal to or greater than a specific threshold value. However, this is merely an exemplary embodiment, and, therefore, the PT-RS mapping method (frequency axis distance/density, and so on) may vary depending upon multiple MCS durations.

For example, RB offset and/or subcarrier offset value(s) for a PT-RS may be (pre-)configured for a UE per resource pool having a lowest RB index and/or lowest subcarrier index for a PSSCH as reference point. Alternatively, for example, a transmitting UE may determine RB offset and/or subcarrier offset value(s) for a PT-RS based on Cyclic Redundancy Check (CRC). Even more specifically, for example, in case of broadcast communication, a transmitting UE may determine RB offset and/or subcarrier offset value(s) for a PT-RS based on CRC. For example, in case of unicast communication and/or groupcast communication, a transmitting UE may determine RB offset and/or subcarrier offset value(s) for a PT-RS based on L1 Source ID and/or L1 Destination ID.

For example, RB offset and/or subcarrier offset value(s) for a PT-RS may be (pre-)configured for a UE per resource pool having a lowest RB index and/or lowest subcarrier index for a resource pool as reference point.

For example, RB offset and/or subcarrier offset value(s) for a PT-RS may be (pre-)configured for a UE per resource pool having a lowest RB index and/or lowest subcarrier index for a common RB grid (Point A) as reference point.

For example, RB offset and/or subcarrier offset value(s) for a PT-RS may be (pre-)configured for a UE per resource pool having a lowest RB index and/or lowest subcarrier index for a sidelink BWP as reference point.

All parameters (related to PT-RS) of the present disclosure may be differently or independently configured in accordance with the resource pool and/or MCS and/or frequency size related to data transmission and/or carrier frequency and/or absolute/relative speed of UE and/or congestion level and/or service type and/or channel priority level and/or cast type, and so on. For example, a UE may differently or independently configure or determine all parameters (related to PT-RS) of the present disclosure in accordance with the resource pool and/or MCS and/or frequency size related to data transmission and/or carrier frequency and/or absolute/relative speed of UE and/or congestion level and/or service type and/or channel priority level and/or cast type, and so on.

Meanwhile, conflict may occur between a PT-RS and another signaling or channel being scheduled/allocated within a PSSCH resource region in accordance with a resource mapping pattern of the PT-RS. That is, based on a resource mapping pattern of a specific PT-RS, a resource having the PT-RS mapped thereto may overlay with a resource being scheduled/allocated for another signaling or channel in a PSSCH resource region. In order to prevent conflict between the PT-RS and another signaling/channel or overlaying of the PT-RS mapping resource and the resource being scheduled/allocated for the other signaling/channel, for example, in case a DMRS for PSSCH (PSSCH DMRS), a Sidelink Channel State Information Reference Signal (CSI-RS) (SL CSI-RS), a PSCCH, and/or (in case of a 2-stage SCI transmission) resource for 2nd SCI transmission (e.g., PSCCH or PSSCH) is/are scheduled/allocated/mapped to a time-frequency resource location where the UE intends to map the PT-RS, the UE may not map the PT-RS to the time-frequency resource location and may perform puncturing or rate matching of the time-frequency resource (e.g., one or more RE(s)). Additionally/alternatively, for example, in a symbol being used for Automatic Gain Control (AGC) (e.g., a first symbol of a PSSCH resource), the UE may not map the PT-RS to the time-frequency resource location and may perform puncturing or rate matching of the time-frequency resource (e.g., one or more RE(s)). Additionally/alternatively, for example, in case a resource being reserved a specific UE (e.g., the UE or a counterpart intending to transmit a PT-RS) is scheduled/allocated/mapped to a time-frequency resource location where the UE intends to map the PT-RS, the UE may not map the PT-RS to the time-frequency resource location and may perform puncturing or rate matching of the time-frequency resource (e.g., one or more RE(s)). For example, in order to prevent overlaying of the PT-RS mapping resource and the resource being scheduled/allocated for another signaling/channel, the UE may map and transmit the PT-RS after the resource being scheduled/allocated for the other signaling/channel. For example, a location of a start symbol having a PT-RS mapped thereto may be configured to be located after the resource being scheduled/allocated for the other signaling/channel. For example, a start symbol to which a PT-RS may be mapped may be a symbol after an AGC symbol over the PSSCH resource. For example, the UE may map PT-RS starting from a second symbol of the PSCCH resource and may then perform transmission. More characteristically, for example, (in case of a 2-stage SCI transmission) in case a resource for 2nd SCI transmission (e.g., PSCCH or PSSCH) is scheduled/allocated/mapped to a time-frequency resource location where the UE intends to map the PT-RS, the UE may perform rate matching or puncturing for a resource for a 2nd SCI.

Meanwhile, a resource mapping pattern of a PT-RS may be differently applied or configured for a UE in accordance with parameters (or information), such as an MCS, a number of RBs or subchannels being allocated for a PSSCH, a ratio between a number of RBs for PSCCH and a number of RBs for PSSCH, a speed/velocity of a transmitting UE, a service type, and/or a Layer1 (L1)—priority information, and so on. For example, appropriate parameters being related to PT-RS resource mapping (e.g., time axis gap (or distance) and/or frequency axis gap (or distance) between PT-RSs, and so on) may be (pre-)configured for each of the parameters (or information). Additionally, for example, the transmitting UE may determine an appropriate resource mapping pattern of a PT-RS in accordance with a value of the parameter related to PT-RS resource mapping. Additionally, for example, the UE may map a PT-RS to a time-frequency resource based on the determined resource mapping pattern of a PT-RS and may then perform transmission. Alternatively, for example, the resource mapping pattern of a PT-RS may be indicated by SCI. That is, a UE transmitting PT-RS may transmit, via SCI, information related to the resource mapping pattern of a PT-RS to a counterpart UE intending to transmit a PT-RS. Thereafter, the counterpart UE may receive, via SCI, information related to the resource mapping pattern of a PT-RS, and, based on the information related to the resource mapping pattern of a PT-RS, the counterpart UE may determine a time-frequency resource having a PT-RS mapped thereto and may receive a PT-RS. At this point, for example, a value being related to the resource mapping pattern information of a PT-RS that can be indicated via SCI may be limitedly or differently configured in accordance with an MCS, a number of RBs or subchannels being allocated for a PSSCH, a ratio between a number of RBs for PSCCH and a number of RBs for PSSCH, a speed/velocity of a transmitting UE, a service type, and/or a Layer1 (L1)—priority information, and so on. More characteristically, for example, the SCI may be 2nd SCI (in case of a 2-stage SCI transmission). At this point, for example, the information related to the resource mapping pattern of a PT-RS may be indicated by 2nd SCI being transmitted through PSSCH.

Meanwhile, a number of antenna ports through which the PT-RS is to be transmitted may be different from a number of antenna ports or number of layers for a PSSCH that is to be transmitted together. For example, a number of antenna ports for the PT-RS may be (pre-)configured for the UE per resource pool. For example, the UE may transmit antenna port number information for the PT-RS via SCI. As another example, although the number of PT-RS antenna ports is (pre-)configured to be equal to 2 for the UE, in case the corresponding number of antenna ports or layers for PSSCH is equal to 1, the UE may change the number of antenna ports for PT-RS to 1. In other words, the number of antenna ports for PT-RS may be equal to or smaller than a number of PSSCH DMRS antenna ports. For example, the number of antenna ports for PT-RS may always be equal to 1. The PT-RS may be a specific situation (e.g., a case where an operating frequency domain is FR2, or a case where PT-RS transmission is configured by a higher layer). For example, in case 2 antenna ports exist, an association between PT-RS and PSSCH DMRS may be a first PT-RS antenna port being linked to a first DMRS antenna port, and a second PT-RS antenna port being linked to a second DMRS antenna port. Alternatively, for example, in case 2 antenna ports exist, an association between PT-RS and PSSCH DMRS may be (pre-)configured for the UE per resource pool. As another example, the UE may then transmit information on an association between PT-RS antenna port and PSSCH DMRS antenna port via SCI. The association may denote that different RSs experience a same channel environment and that each RS may estimate the same channel environment.

For example, in case the number of antenna ports for PT-RS is equal to 1, and in case the number of layers or number of antenna ports for PDS SCH is equal 2, an association between PT-RS antenna port and PSSCH DMRS antenna port may be defined in advance. For example, a PSSCH DMRS antenna port having a low or high index may always be selected. Alternatively, for example, in case the number of antenna ports for PT-RS is equal to 1, and in case the number of layers or number of antenna ports for PDSSCH is equal 2, an association between PT-RS antenna port and PSSCH DMRS antenna port may be (pre-)configured for the UE per resource pool. As another example, the UE may then transmit information on an association between PT-RS antenna port and PSSCH DMRS antenna port via SCI.

As another method, a number of antenna ports through which PT-RS is to be transmitted/received may also be equal to the number of layers or number of antenna ports of a PSSCH respective to the corresponding PT-RS. At this point, in case 2 antenna ports exist, an association between PT-RS and PSSCH DMRS may be a first PT-RS antenna port being linked to a first DMRS antenna port, and a second PT-RS antenna port being linked to a second DMRS antenna port. Alternatively, the link may be (pre-)configured for the UE per resource pool. For example, information on the link relationship may be transmitted via SCI.

Referring back to FIG. 14, in step S1410, the transmitting UE may transmit a reference signal to a receiving UE. For example, the transmitting UE may transmit a DMRS for PSCCH to a receiving UE. For example, the transmitting UE may transmit a PT-RS to a receiving UE.

Additionally, the transmitting UE may transmit configuration information related to a reference signal (e.g., configuration information related to PT-RS) to the receiving UE. Alternatively, a receiving UE may receive configuration information related to a reference signal (e.g., configuration information related to PT-RS) from a network/base station. For example, the configuration information related to PT-RS may include a parameter related to density on a frequency axis of a time-frequency resource on which PT-RS is transmitted, a parameter related to density on a time axis of a time-frequency resource on which PT-RS is transmitted, a parameter related to an Energy Per Resource Element (EPRE) ratio between PT-RS and sidelink channel, a parameter related to resource offset, and so on.

According to an embodiment of the present disclosure, a transmitting UE may transmit a PT-RS to a receiving UE by using a resource corresponding to a first RB group or first subchannel group. That is, a transmitting UE may efficiently deploy PT-RS based on PSSCH deployment.

Figure 19:
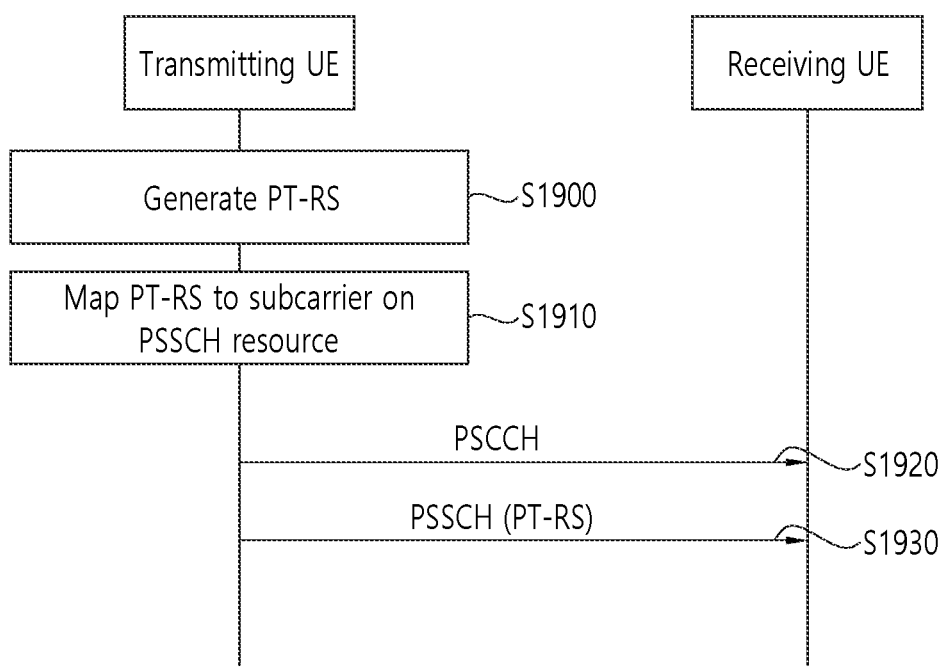
FIG. 19 shows a method for transmitting a PT-RS, by a transmitting UE, based on an RB offset and/or subcarrier offset, in accordance with an embodiment of the present disclosure.

FIG. 19 shows a method for transmitting a PT-RS, by a transmitting UE, based on an RB offset and/or subcarrier offset, in accordance with an embodiment of the present disclosure. The embodiment of FIG. 19 may be combined with other various embodiments of the present disclosure.

Referring to FIG. 19, in step S1900, a transmitting UE may generate PT-RS. For example, a transmitting UE may generate a PT-RS sequence. For example, a transmitting UE may generate PT-RS in accordance with the above-described embodiment.

In step S1910, the transmitting UE may map a PT-RS to a subcarrier on a PSSCH resource. More specifically, based on Cyclic Redundancy Check (CRC) for PSCCH, the transmitting UE may determine RB offset and/or subcarrier offset for PT-RS. Thereafter, based on the RB offset and/or subcarrier offset for PT-RS, the transmitting UE may map a PT-RS to a subcarrier on the PSSCH resource. For example, in order to map the PT-RS to a subcarrier, a subcarrier within a resource block being allocated for PSSCH transmission may be indexed in accordance with a procedure described below in Table 5.

[Table 5]

For the purpose of PT-RS mapping, the resource blocks allocated for PSSCH transmission are numbered from 0 to $N_{RB}-1$ from the lowest scheduled resource block to the highest. The corresponding subcarriers in this set of resource blocks are numbered in increasing order starting from the lowest frequency from 0 to $(N^{RB}_{sc}=N_{RB})-1$.

Referring to Table 5, for example, multiple RBs being allocated to the transmitting UE for PSSCH transmission may be serially indexed starting from a lowest RB to a highest RB. For example, multiple subcarriers of the multiple RBs being allocated to the transmitting UE for PSSCH transmission may be serially indexed starting from a lowest subcarrier to a highest subcarrier. For example, $N_{RB}$ may be a number of RBs being scheduled or allocated to the transmitting UE. For example, $N^{RB}_{sc}$ may be a number of subcarriers within one RB.

For example, the transmitting UE may obtain the RB offset and/or subcarrier offset for PT-RS based on Equation 1.

$$k = k^{RE}_{ref} + (iK_{PT-RS} + k^{RB}_{ref})N^{RB}_{sc} \quad \text{[Equation 1]}$$

$$k^{RB}_{ref} = \begin{cases} N_{ID} \bmod K_{PT-RS} & \text{if } N_{RB} \bmod K_{PT-RS} = 0 \\ N_{ID} \bmod (N_{RB} \bmod K_{PT-RS}) & \text{otherwise} \end{cases}$$

Herein, for example, k may be a subcarrier offset related to PT-RS, $k^{RE}_{ref}$ may be an RE offset related to PT-RS, i may be a positive integer, $K_{PT-RS}$ may be equal to 2 or 4, $k^{RB}_{ref}$ may be an RB offset related to PT-RS, $N_{RB}$ may be a number of RBs being scheduled or allocated to a transmitting UE, and $N^{RB}_{sc}$ may be a number of subcarriers within one RB. For example, $N_{ID}$ may be obtained based on a CRC on a PSCCH related to (or associated with) the PSSCH. For example, a CRC on a PSCCH related to (or associated with) the PSSCH may be 24 bits, and $N_{ID}$ may be 16 bits of the CRC among 24 bits of the CRC on the PSCCH related to (or associated with) the PSSCH. For example, the 16 bits may be 16 bits of Least Significant Bits (LSBs) among the total of 24 bits. For example, $k^{RE}_{ref}$ may be obtained based on Table 6 for a DM-RS port being related to (or associated with) a PT-RS port. For example, $k^{RE}_{ref}$ may be pre-defined in advance as shown in Table 6.

TABLE 6

| DM-RS antenna port | $k^{RE}_{ref}$ resourceElementOffset | | | |
|---|---|---|---|---|
| $\tilde{p}$ | offset00 | offset01 | offset10 | offset11 |
| 0 | 0 | 2 | 6 | 8 |
| 1 | 2 | 4 | 8 | 10 |

In step S1920, the transmitting UE may transmit a PSCCH to a receiving UE.

In step S1930, the transmitting UE may transmit a PSSCH related to the PSCCH to the receiving UE. For example, the transmitting UE may map a PT-RS on a subcarrier related to index k within a PSSCH resource related to the PSCCH, and, then, the transmitting UE may transmit the PT-RS.

According to various embodiments of the present disclosure, a transmitting UE may map and transmit a PT-RS on a PSSCH resource based on a CRC on a PSCCH, and a receiving UE may receive a PT-RS on a PSCCH resource based on a CRC on a PSCCH, which is transmitted by a transmitting UE.

Figure 20:
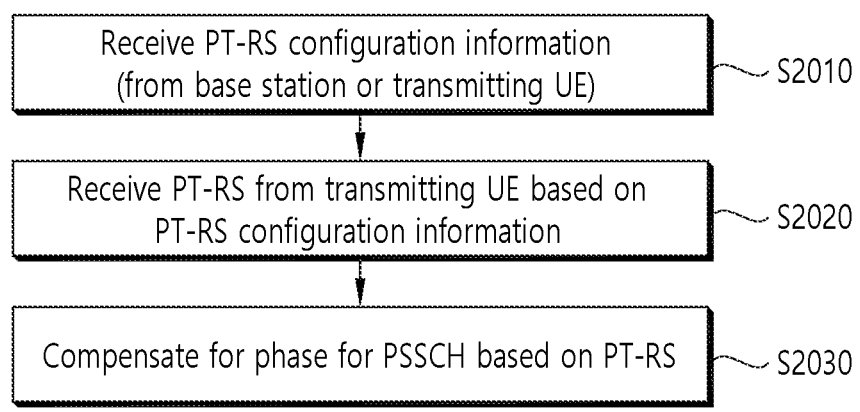
FIG. 20 shows a method for receiving a PT-RS, by a receiving UE, in accordance with an embodiment of the present disclosure.

FIG. 20 shows a method for receiving a PT-RS, by a receiving UE, in accordance with an embodiment of the present disclosure. The embodiment of FIG. 20 may be combined with other various embodiments of the present disclosure.

Referring to FIG. 20, in step S2010, a receiving UE may receive PT-RS configuration information (from a base station or transmitting UE). In step S2020, the receiving UE may receive the PT-RS from a transmitting UE based on the PT-RS configuration information. In step S2030, the receiving UR may compensate for a phase for a PSSCH based on the PT-RS. For example, the PT-RS configuration information may include a parameter related to density on a frequency axis of a time-frequency resource on which PT-RS is transmitted, a parameter related to density on a time axis of a time-frequency resource on which PT-RS is transmitted, a parameter related to an EPRE ratio between PT-RS and sidelink channel, a parameter related to resource offset, and so on. The proposed method may be applied to a device (or apparatus) that will be described below.

Figure 21:
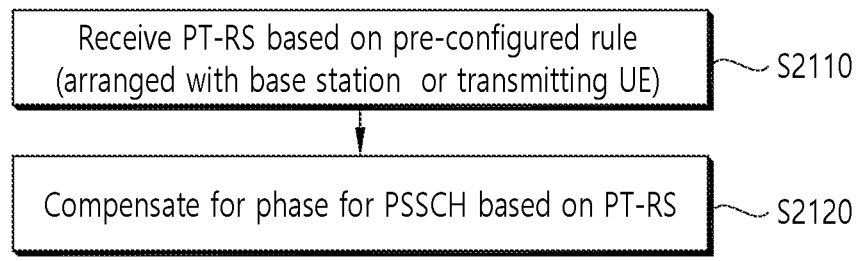
FIG. 21 shows a method for receiving a PT-RS, by a receiving UE, in accordance with an embodiment of the present disclosure.

FIG. 21 shows a method for receiving a PT-RS, by a receiving UE, in accordance with an embodiment of the present disclosure. The embodiment of FIG. 21 may be combined with other various embodiments of the present disclosure.

Referring to FIG. 21, in step S2110, a receiving UE may receive a PT-RS based on a pre-configured rule (that is arranged with a base station or transmitting UE). In step S2120, the receiving UE may compensate for a phase for a PSSCH based on the PT-RS. The proposed method may be applied to a device (or apparatus) that will be described below.

Figure 22:
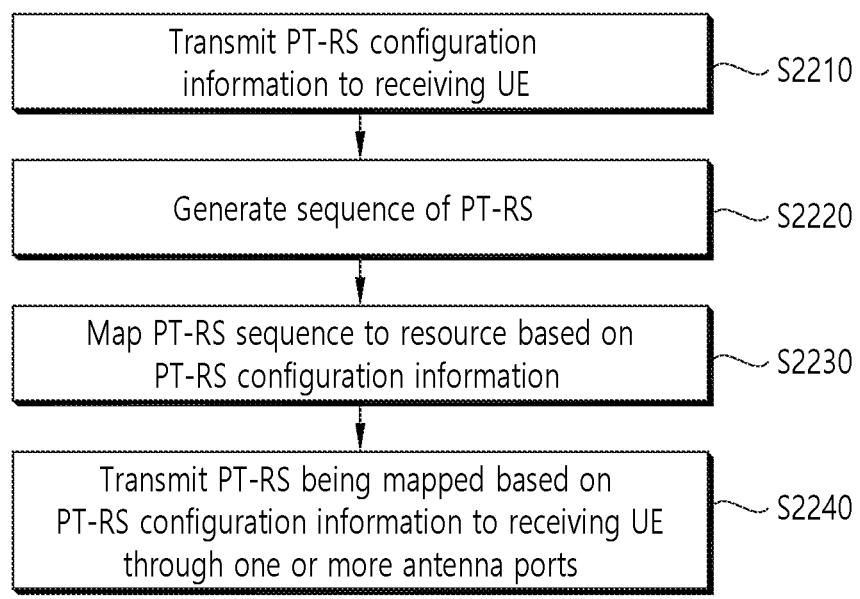
FIG. 22 shows a method for transmitting a PT-RS, by a transmitting UE, in accordance with an embodiment of the present disclosure.

FIG. 22 shows a method for transmitting a PT-RS, by a transmitting UE, in accordance with an embodiment of the present disclosure. The embodiment of FIG. 22 may be combined with other various embodiments of the present disclosure.

Referring to FIG. 22, in step S2210, a transmitting UE may transmit PT-RS configuration information to a receiving UE. In step S2220, the transmitting UE may generate a sequence of a PT-RS. In step S2230, the transmitting UE may map the PT-RS sequence to a resource based on the PT-RS configuration information. In step S2240, the transmitting UE may transmit the PT-RS, which is mapped based on the PT-RS configuration information, to the receiving UE through one or more antenna ports. The PT-RS configuration information may include a parameter related to density on a frequency axis of a time-frequency resource on which PT-RS is transmitted, a parameter related to density on a time axis of a time-frequency resource on which PT-RS is transmitted, a parameter related to an EPRE ratio between PT-RS and sidelink channel, a parameter related to resource offset, and so on. The proposed method may be applied to a device (or apparatus) that will be described below.

Figure 23:
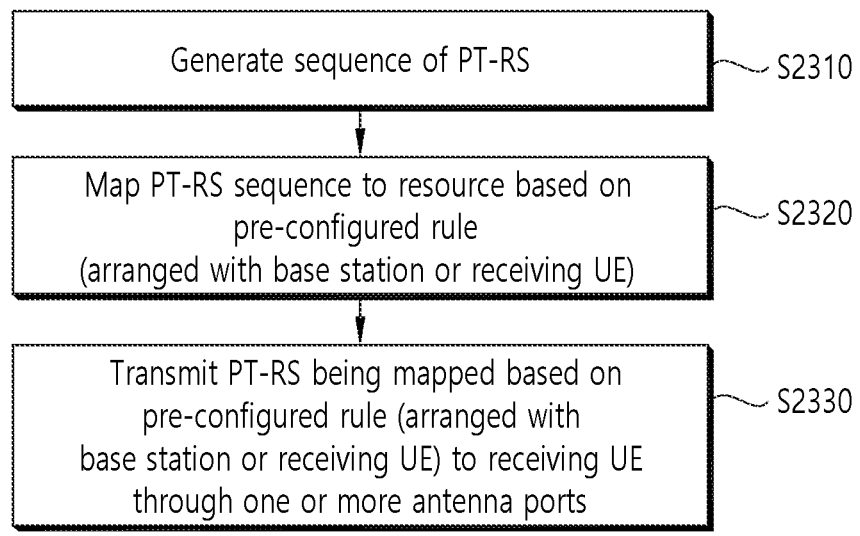
FIG. 23 shows a method for transmitting a PT-RS, by a transmitting UE, in accordance with an embodiment of the present disclosure.

FIG. 23 shows a method for transmitting a PT-RS, by a transmitting UE, in accordance with an embodiment of the present disclosure. The embodiment of FIG. 23 may be combined with other various embodiments of the present disclosure.

Referring to FIG. 23, in step S2310, a transmitting UE may generate a sequence of a PT-RS. In step S2320, the transmitting UE may map the PT-RS sequence to a resource based on a pre-configured rule (that is arranged with a base station or receiving UE). In step S2330, the transmitting UE may transmit the PT-RS, which is mapped based on the pre-configured rule (that is arranged with a base station or receiving UE), to the receiving UE through one or more antenna ports. The proposed method may be applied to a device (or apparatus) that will be described below.

Figure 24:
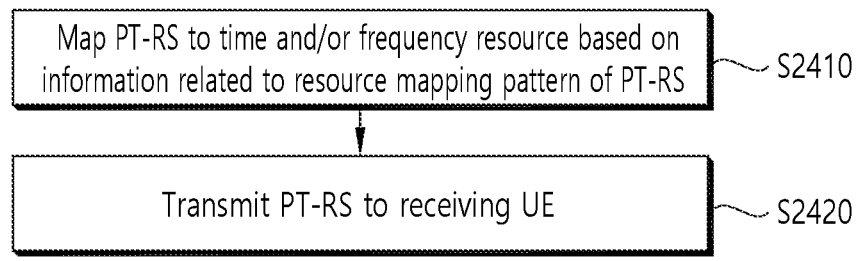
FIG. 24 shows a method for transmitting a PT-RS, by a transmitting UE, in accordance with an embodiment of the present disclosure.

FIG. 24 shows a method for transmitting a PT-RS, by a transmitting UE, in accordance with an embodiment of the present disclosure. The embodiment of FIG. 24 may be combined with other various embodiments of the present disclosure.

Referring to FIG. 24, in step S2410, a transmitting UE may map a PT-RS to a time and/or frequency resource based on information related to a resource mapping pattern of the PT-RS. For example, the transmitting UE may map a PT-RS to a time and/or frequency resource in accordance with various embodiments of the present disclosure. In step S2420, the transmitting UE may transmit a PT-RS to a receiving UE. The proposed method may be applied to a device (or apparatus) that will be described below.

Figure 25:
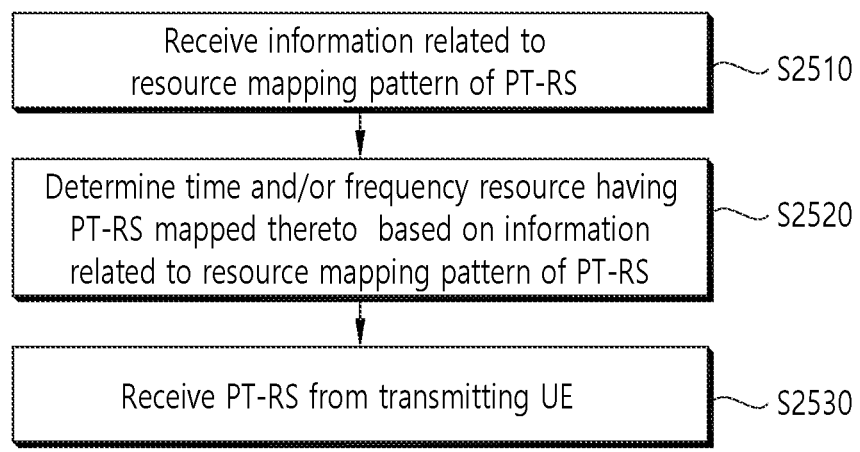
FIG. 25 shows a method for receiving a PT-RS, by a receiving UE, in accordance with an embodiment of the present disclosure.

FIG. 25 shows a method for receiving a PT-RS, by a receiving UE, in accordance with an embodiment of the present disclosure. The embodiment of FIG. 25 may be combined with other various embodiments of the present disclosure.

Referring to FIG. 25, in step S2510, a receiving UE may receive information related to a resource mapping pattern of a PT-RS. In step S2520, the receiving UE may determine a time and/or frequency resource having a PT-RS mapped thereto based on the information related to the resource mapping pattern of a PT-RS. For example, the receiving UE may determine the time and/or frequency resource having a PT-RS mapped thereto in accordance with various embodiments of the present disclosure. In step S2530, the receiving UE may receive a PT-RS from a transmitting UE. The proposed method may be applied to a device (or apparatus) that will be described below.

Figure 26:
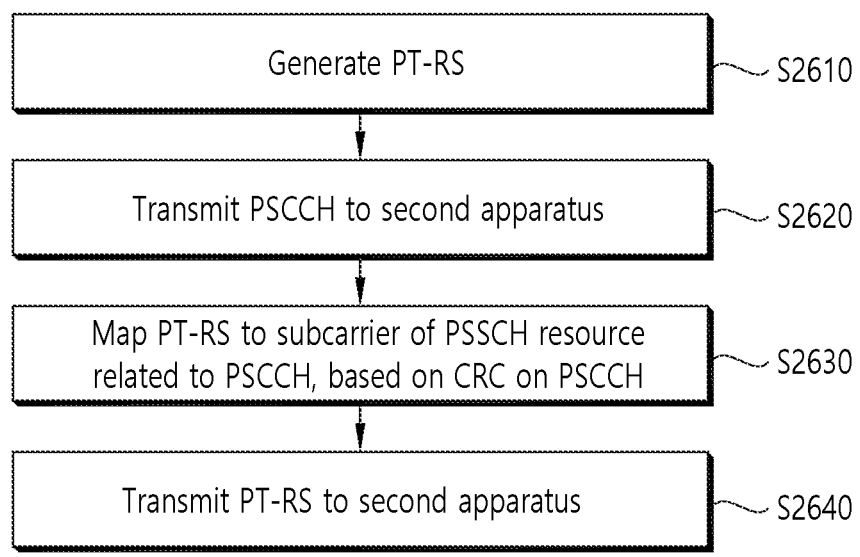
FIG. 26 shows a method for performing wireless communication, by a first apparatus, in accordance with an embodiment of the present disclosure.

FIG. 26 shows a method for performing wireless communication, by a first apparatus, in accordance with an embodiment of the present disclosure. The embodiment of FIG. 26 may be combined with other various embodiments of the present disclosure.

Referring to FIG. 26, in step S2610, a first apparatus may generate a Phase Tracking-Reference Signal (PT-RS).

In step S2620, the first apparatus may transmit a Physical Sidelink Control Channel (PSCCH) to a second apparatus.

In step S2630, based on a Cyclic Redundancy Check (CRC) on the PSCCH, the first apparatus may map the PT-RS to a subcarrier on a Physical Sidelink Shared Channel (PSSCH) resource related to the PSCCH.

In step S2640, the first apparatus may transmit the PT-RS to the second apparatus.

For example, a subcarrier offset related to the PT-RS may be obtained based on a CRC on the PSCCH. For example, the PT-RS may be mapped to the subcarrier on the PSSCH resource, based on a subcarrier having a lowest index, among indexes of multiple subcarriers on the PSSCH resource, and the subcarrier offset. For example, the PT-RS may be mapped to a subcarrier after the subcarrier offset starting from the subcarrier having the lowest index, among indexes of multiple subcarriers on the PSSCH resource.

For example, a Resource Block (RB) offset related to the PT-RS may be obtained based on a CRC on the PSCCH. For example, the PT-RS may be mapped to the subcarrier within multiple RBs on the PSSCH resource, based on an RB having a lowest index, among indexes of multiple RBs on the PSSCH resource, and the RB offset.

For example, a subcarrier offset related to the PT-RS may be obtained based on an RB offset related to the PT-RS and a Resource Element (RE) offset related to the PT-RS. For example, the RE offset related to the PT-RS may be pre-configured for the first apparatus.

For example, the PSSCH resource may include multiple RBs being allocated for the first apparatus for PSSCH transmission.

Additionally, for example, the first apparatus may receive configuration information related to the PT-RS from a base station. For example, the configuration information related to the PT-RS may include at least one of information related to time-axis density of the PT-RS or information related to frequency-axis density of the PT-RS.

For example, the PT-RS may not be mapped on a PSCCH resource.

For example, the PT-RS may be mapped on the PSSCH resource within a first RB group at a higher priority than a second RB group. Herein, the first RB group may include a PSCCH resource and the PSSCH resource, and the second RB group may include the PSSCH resource and may not include the PSCCH resource.

For example, a number of antenna ports related to the PT-RS may be equal to a number of antenna ports related to a Demodulation Reference Signal (DMRS) on a PSSCH. For example, an association between the antenna ports related to the PT-RS and the antenna ports related to a DMRS on the PSSCH may be fixed.

The proposed method may be applied to a device (or apparatus) that will be described below. Firstly, a processor (102) of a first apparatus (100) may generate a Phase Tracking-Reference Signal (PT-RS). Then, the processor (102) of the first apparatus (100) may control a transceiver (106) so that a Physical Sidelink Control Channel (PSCCH) can be transmitted to a second apparatus. Thereafter, based on a Cyclic Redundancy Check (CRC) on the PSSCH, the processor (102) of the first apparatus (100) may map the PT-RS to a subcarrier on a Physical Sidelink Shared Channel (PSSCH) resource related to the PSCCH. Finally, the processor (102) of the first apparatus (100) may control the transceiver (106) so that the PT-RS can be transmitted to the second apparatus.

According to an embodiment of the present disclosure, a first apparatus for performing wireless communication may be provided. For example, the first apparatus may include one or more memories storing instructions, one or more transceivers, and one or more processors connected to the one or more memories and the one or more transceivers. For example, the one or more processors may execute the instructions to generate a Phase Tracking—Reference Signal (PT-RS), to transmit a Physical Sidelink Control Channel (PSCCH) to a second apparatus, to map, based on a Cyclic Redundancy Check (CRC) on the PSCCH, the PT-RS to a subcarrier on a Physical Sidelink Shared Channel (PSSCH) resource related to the PSCCH, and to transmit the PT-RS to the second apparatus.

According to an embodiment of the present disclosure, an apparatus configured to control a first user equipment (UE) may be provided. For example, the apparatus may include one or more processors, and one or more memories operably connectable to the one or more processors and storing instructions. For example, the one or more processors may execute the instructions to generate a Phase Tracking—Reference Signal (PT-RS), to transmit a Physical Sidelink Control Channel (PSCCH) to a second apparatus, to map, based on a Cyclic Redundancy Check (CRC) on the PSCCH, the PT-RS to a subcarrier on a Physical Sidelink Shared Channel (PSSCH) resource related to the PSCCH, and to transmit the PT-RS to the second apparatus.

According to an embodiment of the present disclosure, a non-transitory computer-readable medium having instructions recorded thereon may be provided. For example, when enacted by one or more processors, the instructions cause the one or more processors to generate, by a first apparatus, a Phase Tracking—Reference Signal (PT-RS), to transmit, by the first apparatus, a Physical Sidelink Control Channel (PSCCH) to a second apparatus, to map, by the first apparatus, based on a Cyclic Redundancy Check (CRC) on the PSCCH, the PT-RS to a subcarrier on a Physical Sidelink Shared Channel (PSSCH) resource related to the PSCCH, and to transmit, by the first apparatus, the PT-RS to the second apparatus.

Figure 27:
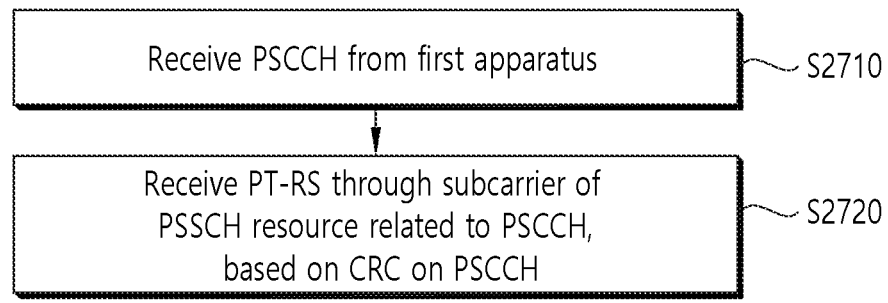
FIG. 27 shows a method for performing wireless communication, by a second apparatus, in accordance with an embodiment of the present disclosure.

FIG. 27 shows a method for performing wireless communication, by a second apparatus, in accordance with an embodiment of the present disclosure. The embodiment of FIG. 27 may be combined with other various embodiments of the present disclosure.

Referring to FIG. 27, in step S2710, a second apparatus may receive a Physical Sidelink Control Channel (PSCCH) from a first apparatus.

In step S2720, based on a Cyclic Redundancy Check (CRC) on the PSCCH, the second apparatus may receive a Phase Tracking—Reference Signal (PT-RS) through a subcarrier on a Physical Sidelink Shared Channel (PSSCH) resource related to the PSCCH. For example, the PT-RS may be mapped to the subcarrier on the PSSCH resource based on a CRC on the PSCCH. For example, a subcarrier offset related to the PT-RS may be obtained based on a CRC on the PSCCH. For example, the PT-RS may be mapped to the subcarrier on the PSSCH resource, based on a subcarrier having a lowest index, among indexes of multiple subcarriers on the PSSCH resource, and the subcarrier offset.

The proposed method may be applied to a device (or apparatus) that will be described below. Firstly, a processor (202) of a second apparatus (200) may control a transceiver (206) so that a Physical Sidelink Control Channel (PSCCH) can be received from a first apparatus. Thereafter, the processor (202) of the second apparatus (200) may control the transceiver (206) so that, based on a Cyclic Redundancy Check (CRC) on the PSCCH, a Phase Tracking—Reference Signal (PT-RS) can be received through a subcarrier on a Physical Sidelink Shared Channel (PSSCH) resource related to the PSCCH. For example, the PT-RS may be mapped to the subcarrier on the PSSCH resource based on a CRC on the PSCCH.

According to an embodiment of the present disclosure, a second apparatus for performing wireless communication may be provided. For example, the second apparatus may include one or more memories storing instructions, one or more transceivers, and one or more processors connected to the one or more memories and the one or more transceivers. For example, the one or more processors may execute the instructions to receive a Physical Sidelink Control Channel (PSCCH) from a first apparatus, and to receive, based on a Cyclic Redundancy Check (CRC) on the PSCCH, a Phase Tracking—Reference Signal (PT-RS) through a subcarrier on a Physical Sidelink Shared Channel (PSSCH) resource related to the PSCCH. For example, the PT-RS may be mapped to the subcarrier on the PSSCH resource based on the CRC on the PSCCH.

The embodiments described in this specification may be (partly or fully) combined.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 28:
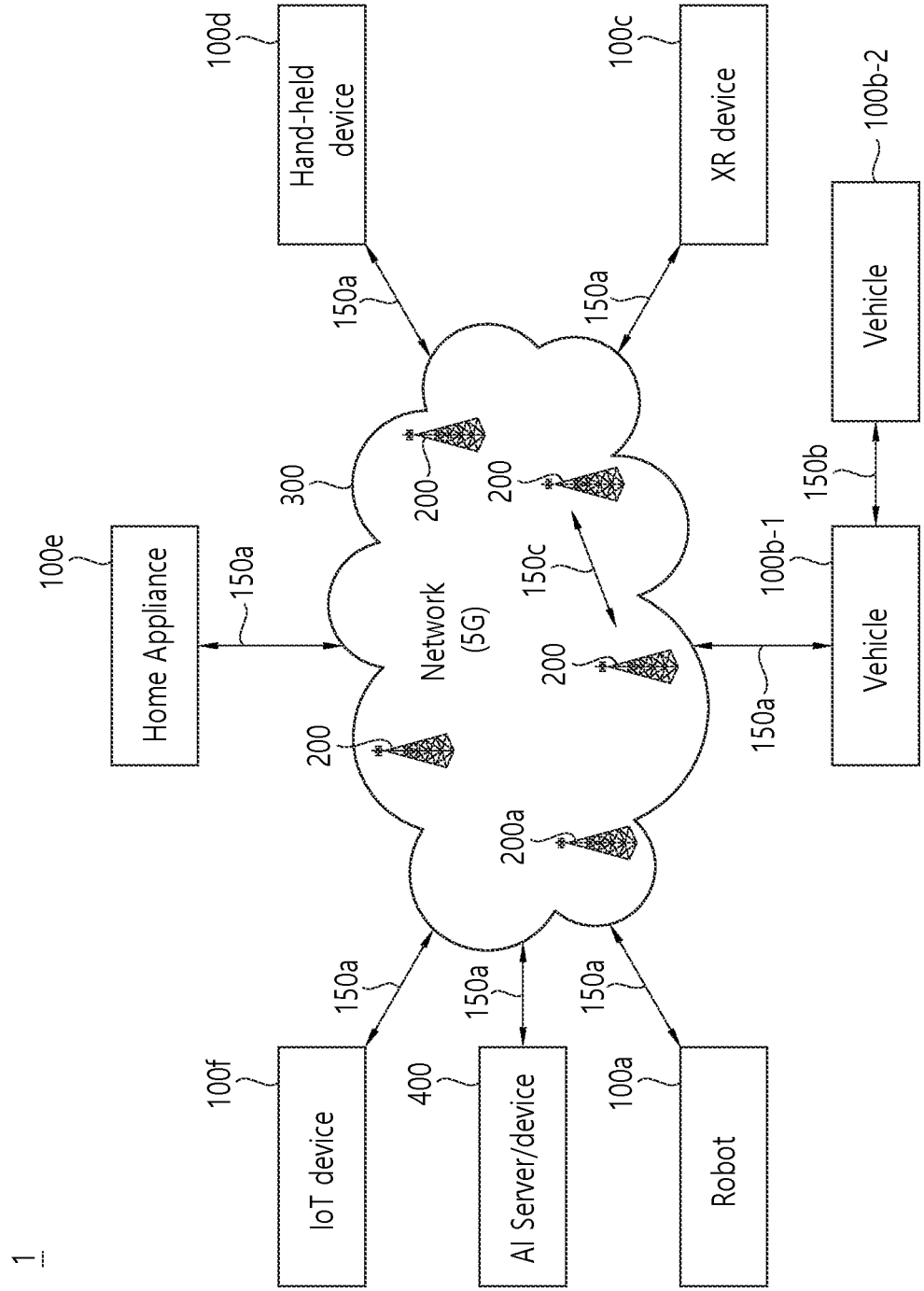
FIG. 28 shows a communication system (1), in accordance with an embodiment of the present disclosure.

FIG. 28 shows a communication system (1), in accordance with an embodiment of the present disclosure.

Referring to FIG. 28, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 29:
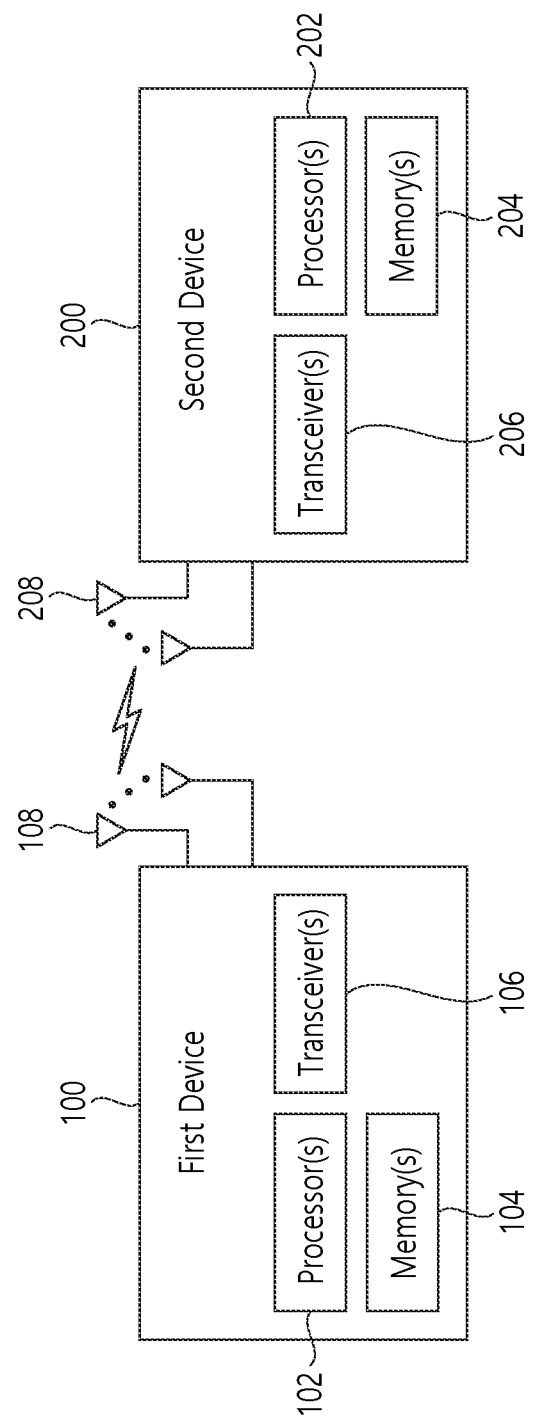
FIG. 29 shows wireless devices, in accordance with an embodiment of the present disclosure.

FIG. 29 shows wireless devices, in accordance with an embodiment of the present disclosure.

Referring to FIG. 29, a first wireless device (100) and a second wireless device (200) may transmit radio signals through a variety of RATs (e.g., LTE and NR). Herein, {the first wireless device (100) and the second wireless device (200)} may correspond to {the wireless device (100*x*) and the BS (200)} and/or {the wireless device (100*x*) and the wireless device (100*x*)} of FIG. 28.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 30:
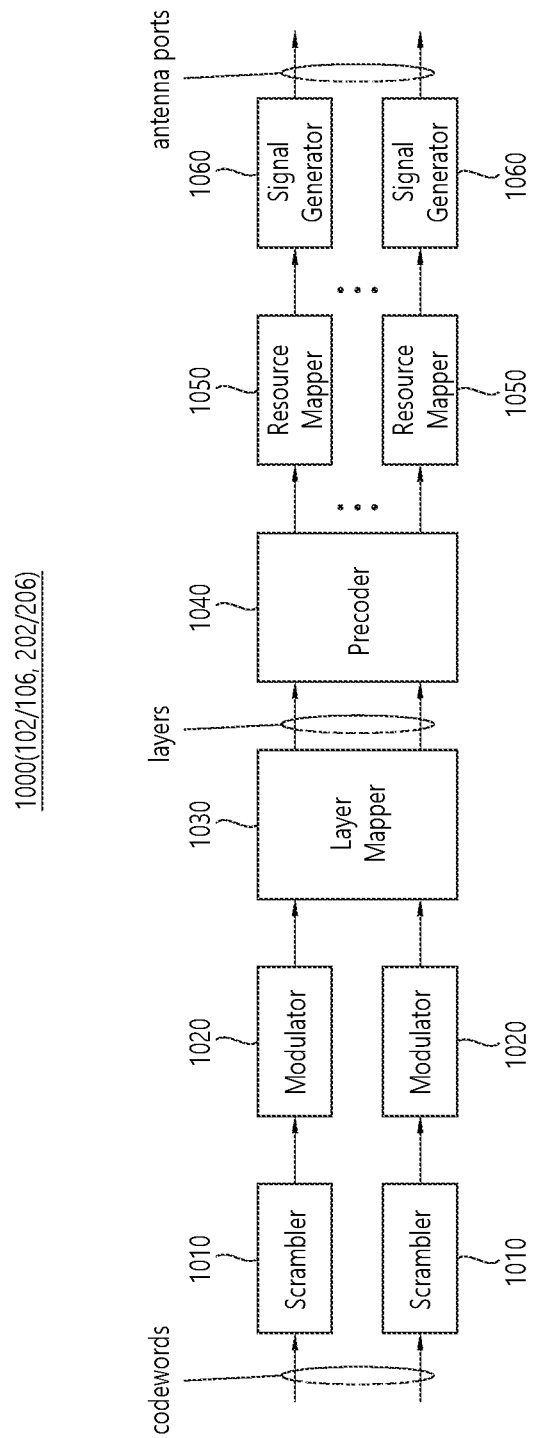
FIG. 30 shows a signal process circuit for a transmission signal, in accordance with an embodiment of the present disclosure.

FIG. 30 shows a signal process circuit for a transmission signal, in accordance with an embodiment of the present disclosure.

Referring to FIG. 30, a signal processing circuit (1000) may include scramblers (1010), modulators (1020), a layer mapper (1030), a precoder (1040), resource mappers (1050), and signal generators (1060). An operation/function of FIG. 30 may be performed, without being limited to, the processors (102, 202) and/or the transceivers (106, 206) of FIG. 29. Hardware elements of FIG. 30 may be implemented by the processors (102, 202) and/or the transceivers (106, 206) of FIG. 29. For example, blocks 1010~1060 may be implemented by the processors (102, 202) of FIG. 29. Alternatively, the blocks 1010~1050 may be implemented by the processors (102, 202) of FIG. 29 and the block 1060 may be implemented by the transceivers (106, 206) of FIG. 29.

Codewords may be converted into radio signals via the signal processing circuit (1000) of FIG. 30. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 30. For example, the wireless devices (e.g., 100, 200 of FIG. 29) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 31:
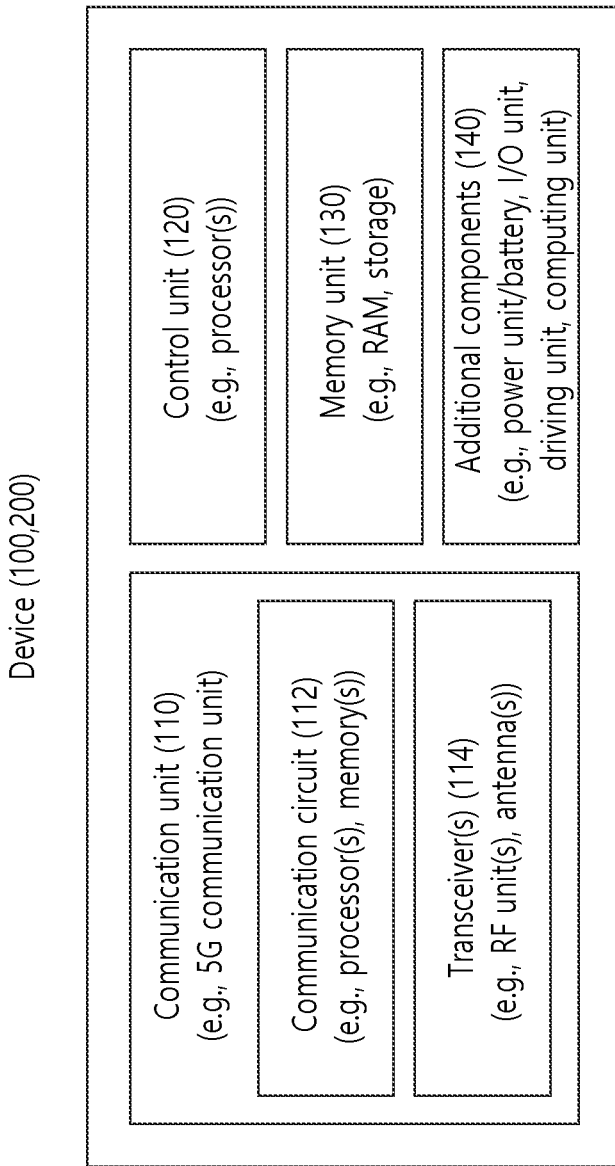
FIG. 31 shows a wireless device, in accordance with an embodiment of the present disclosure.

FIG. 31 shows another example of a wireless device, in accordance with an embodiment of the present disclosure. The wireless device may be implemented in various forms according to a use-case/service (refer to FIG. 28).

Referring to FIG. 31, wireless devices (100, 200) may correspond to the wireless devices (100, 200) of FIG. 29 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 29. For example, the transceiver(s) (114) may include the one or more transceivers (106, 206) and/or the one or more antennas (108, 208) of FIG. 29. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 28), the vehicles (100b-1, 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, and so on. The wireless device may be used in a mobile or fixed place according to a use-example/service.

In FIG. 31, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 31 will be described in detail with reference to the drawings.

Figure 32:
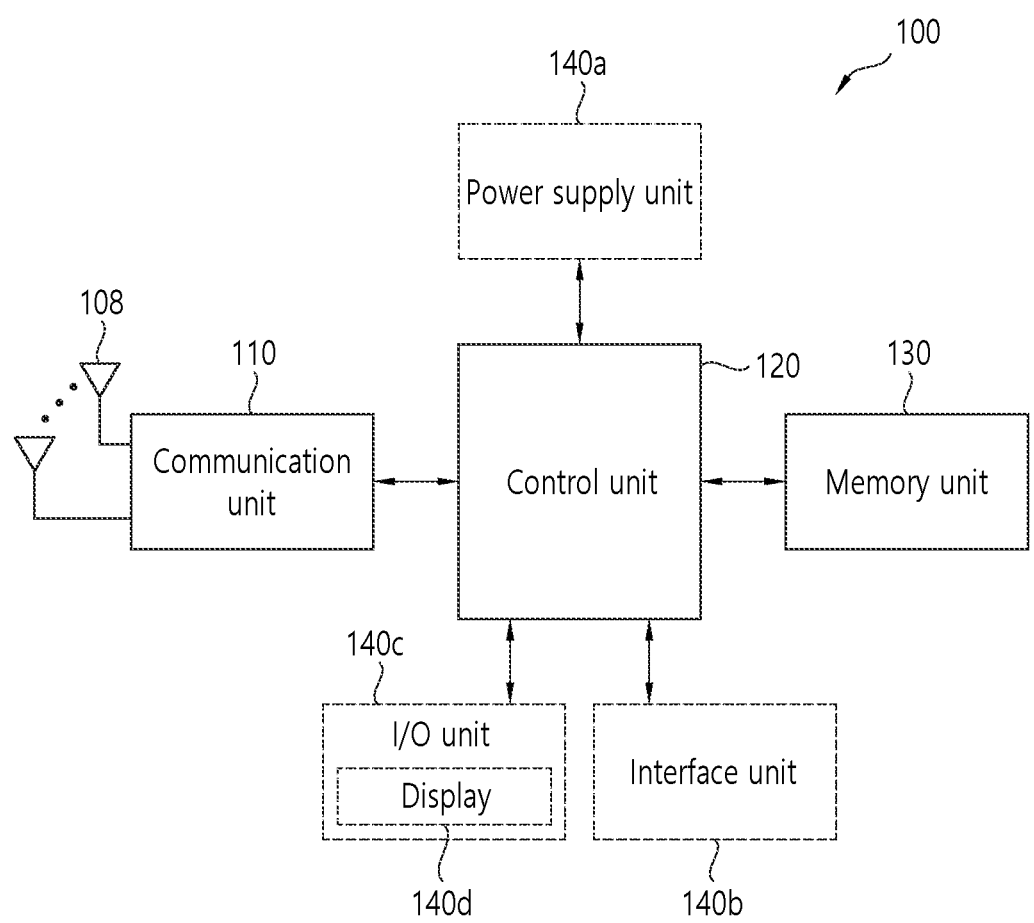
FIG. 32 shows a hand-held device, in accordance with an embodiment of the present disclosure.

FIG. 32 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 32, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 31, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 33:
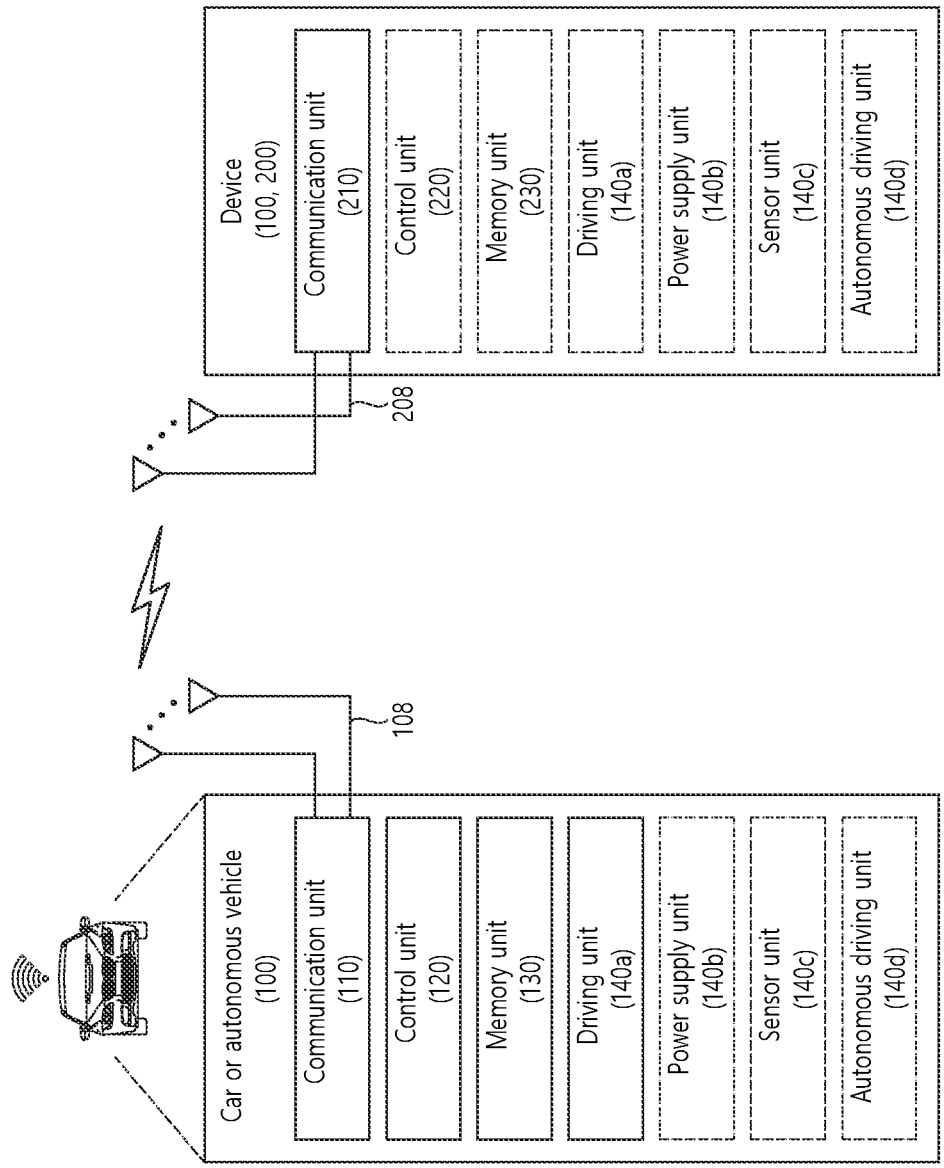
FIG. 33 shows a car or an autonomous vehicle, in accordance with an embodiment of the present disclosure.

FIG. 33 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 33, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 31, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140*a*) may cause the vehicle or the autonomous vehicle (100) to drive on a road. The driving unit (140*a*) may include an engine, a motor, a powertrain, a wheel, a brake, a steering device, and so on. The power supply unit (140*b*) may supply power to the vehicle or the autonomous vehicle (100) and include a wired/wireless charging circuit, a battery, and so on. The sensor unit (140*c*) may obtain a vehicle state, ambient environment information, user information, and so on. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140*d*) may generate an autonomous driving path and a driving plan from the obtained data. The control unit (120) may control the driving unit (140*a*) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
   receiving, from a second apparatus, a sidelink control information (SCI) on a physical sidelink control channel (PSCCH);
   obtaining a resource block (RB) offset related to a phase tracking-reference signal (PT-RS) based on a cyclic redundancy check (CRC) on the PSCCH; and
   receiving, from the second apparatus, the PT-RS through a subcarrier on a physical sidelink shared channel (PSSCH) resource related to the PSCCH, based on the RB offset related to the PT-RS.

2. The method of claim 1, wherein a subcarrier offset related to the PT-RS is obtained based on the CRC on the PSCCH.

3. The method of claim 2, wherein the PT-RS is mapped to the subcarrier on the PSSCH resource, based on (i) a subcarrier having a lowest index, among indexes of multiple subcarriers on the PSSCH resource, and (ii) the subcarrier offset.

4. The method of claim 1, wherein the RB offset is an RB unit offset between a first RB having a lowest index and a second RB to which the PT-RS is mapped.

5. The method of claim 1, wherein the PT-RS is mapped to the subcarrier within multiple RBs on the PSSCH resource, based on (i) an RB having a lowest index among indexes of the multiple RBs on the PSSCH resource, and (ii) the RB offset.

6. The method of claim 1, wherein a subcarrier offset related to the PT-RS is obtained based on the RB offset related to the PT-RS and a resource element (RE) offset related to the PT-RS.

7. The method of claim 6, wherein the RE offset related to the PT-RS is pre-configured for the first apparatus.

8. The method of claim 1, wherein the PSSCH resource includes multiple RBs being allocated for PSSCH transmission.

9. The method of claim 1, further comprising:
   receiving configuration information related to the PT-RS from a base station.

10. The method of claim 9, wherein the configuration information related to the PT-RS includes at least one of information related to time-axis density of the PT-RS or information related to frequency-axis density of the PT-RS.

11. The method of claim 1, wherein the PT-RS is not mapped on a resource for the PSCCH.

12. The method of claim 1, wherein a number of antenna ports related to the PT-RS is equal to a number of antenna ports related to a demodulation reference signal (DMRS) on the PSSCH resource.

13. The method of claim 12, wherein an association between the antenna ports related to the PT-RS and the antenna ports related to the DMRS on the PSSCH resource is fixed.

14. A first apparatus configured to perform wireless communication, the first apparatus comprising:
   one or more memories storing instructions;
   one or more transceivers; and
   one or more processors connected to the one or more memories and the one or more transceivers, wherein the one or more processors execute the instructions to:
   receive, from a second apparatus, a sidelink control information (SCI) on a physical sidelink control channel (PSCCH);
   obtain a resource block (RB) offset related to a phase tracking-reference signal (PT-RS) based on a cyclic redundancy check (CRC) on the PSCCH; and
   receive, from the second apparatus, the PT-RS through a subcarrier on a physical sidelink shared channel (PSSCH) resource related to the PSCCH, based on the RB offset related to the PT-RS.

15. The first apparatus of claim 14, wherein a subcarrier offset related to the PT-RS is obtained based on the CRC on the PSCCH.

16. The first apparatus of claim 15, wherein the PT-RS is mapped to the subcarrier on the PSSCH resource, based on (i) a subcarrier having a lowest index, among indexes of multiple subcarriers on the PSSCH resource, and (ii) the subcarrier offset.

17. The first apparatus of claim 14, wherein the RB offset is an RB unit offset between a first RB having a lowest index and a second RB to which the PT-RS is mapped.

18. The first apparatus of claim 14, wherein the PT-RS is mapped to the subcarrier within multiple RBs on the PSSCH resource, based on (i) an RB having a lowest index among indexes of the multiple RBs on the PSSCH resource, and (ii) the RB offset.

19. The first apparatus of claim 14, wherein the PT-RS is not mapped on a resource for the PSCCH.

20. An apparatus configured to control a first user equipment (UE), the apparatus comprising:

one or more processors; and one or more memories connected to the one or more processors and storing instructions, wherein the one or more processors execute the instructions to:

receive, from a second UE, a sidelink control information (SCI) on a physical sidelink control channel (PSCCH);

obtain a resource block (RB) offset related to a phase tracking-reference signal (PT-RS) based on a cyclic redundancy check (CRC) on the PSCCH; and receive, from the second UE, the PT-RS through a subcarrier on a physical sidelink shared channel (PSSCH) resource related to the PSCCH, based on the RB offset related to the PT-RS.

* * * * *